(12) United States Patent
Grant et al.

(10) Patent No.: US 12,255,840 B2
(45) Date of Patent: Mar. 18, 2025

(54) CONTROL CHANNEL CONFIGURATION FOR UNLICENSED WIDEBAND RADIO SYSTEMS

(71) Applicant: Telefonaktiebolaget LM Ericsson (PUBL), Stockholm (SE)

(72) Inventors: Stephen Grant, Pleasanton, CA (US); Jung-Fu Cheng, Fremont, CA (US); Havish Koorapaty, Saratoga, CA (US); Sorour Falahati, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 353 days.

(21) Appl. No.: 17/765,923

(22) PCT Filed: Sep. 28, 2020

(86) PCT No.: PCT/EP2020/077071
§ 371 (c)(1),
(2) Date: Apr. 1, 2022

(87) PCT Pub. No.: WO2021/063872
PCT Pub. Date: Apr. 8, 2021

(65) Prior Publication Data
US 2022/0368489 A1 Nov. 17, 2022

Related U.S. Application Data

(60) Provisional application No. 62/910,946, filed on Oct. 4, 2019.

(51) Int. Cl.
*H04L 27/26* (2006.01)
*H04L 5/00* (2006.01)
*H04W 72/04* (2023.01)

(52) U.S. Cl.
CPC .................. *H04L 5/0048* (2013.01)

(58) Field of Classification Search
None
See application file for complete search history.

(56) References Cited

U.S. PATENT DOCUMENTS

2011/0111779 A1\* 5/2011 Krishnamurthy ..... H04L 5/0094
455/501
2015/0156763 A1\* 6/2015 Seo ........................ H04L 5/1469
370/329
(Continued)

FOREIGN PATENT DOCUMENTS

WO 2020 039388 A1 2/2020

OTHER PUBLICATIONS

3GPP TSG RAN WG1 #98; Prague, CZ; Source: LG Electronics; Title: Wide-band operation for NR-U (R1-1908539)—Aug. 26-30, 2019.

(Continued)

*Primary Examiner* — Sai Aung
(74) *Attorney, Agent, or Firm* — Baker Botts L.L.P.

(57) ABSTRACT

According to certain embodiments, a method performed by a wireless device comprises determining a subset of a set of control channel elements (CCEs) to monitor within one or more frequency domain monitoring occasions. The subset of CCEs excludes any CCEs of the set of CCEs that partially or fully overlap one or more guard physical resource blocks (PRBs). The method comprises monitoring the determined subset of CCEs for one or more control channel candidates within the frequency domain monitoring occasion(s).

20 Claims, 21 Drawing Sheets

(56) References Cited

U.S. PATENT DOCUMENTS

| | | | |
|---|---|---|---|
| 2017/0055275 A1* | 2/2017 | Lee | H04B 7/26 |
| 2020/0280971 A1 | 9/2020 | Moon et al. | |
| 2021/0266897 A1* | 8/2021 | Heiser | H04L 5/0037 |
| 2021/0385826 A1* | 12/2021 | Moon | H04L 1/00 |
| 2022/0039158 A1* | 2/2022 | Awadin | H04W 74/0866 |
| 2022/0217720 A1* | 7/2022 | Tiirola | H04W 72/23 |
| 2022/0386350 A1* | 12/2022 | Takeda | H04W 72/23 |
| 2024/0146457 A1* | 5/2024 | Si | H04L 1/0068 |

OTHER PUBLICATIONS

3GPP TSG RAN WG1 Meeting #98; Prague, Czech Rep; Source: Spreadtrum Communications; Title: Wideband operation in NR-U (R1-1908966)—Aug. 26-30, 2019.

3GPP TSG-RAN WG1 Meeting #98; Prague, Czech Republic; Source: Ericsson; Title: Wideband operation for NR-U (R1-1909302)—Aug. 26-30, 2019.

PCT International Search Report issued for International application No. PCT/EP2020/077071—Dec. 11, 2020.

PCT Written Opinion of the International Searching Authority issued for International application No. PCT/EP2020/077071—Dec. 11, 2020.

\* cited by examiner

```
SearchSpace ::=            SEQUENCE {
    searchSpaceId              SearchSpaceId,
    controlResourceSetId       ControlResourceSetId                            OPTIONAL,    -- Cond
SetupOnly
    monitoringSlotPeriodicityAndOffset  CHOICE {
        sl1                        NULL,
        sl2                        INTEGER (0..1),
        sl4                        INTEGER (0..3),
        sl5                        INTEGER (0..4),
        sl8                        INTEGER (0..7),
        sl10                       INTEGER (0..9),
        sl16                       INTEGER (0..15),
        sl20                       INTEGER (0..19),
        sl40                       INTEGER (0..39),
        sl80                       INTEGER (0..79),
        sl160                      INTEGER (0..159),
        sl320                      INTEGER (0..319),
        sl640                      INTEGER (0..639),
        sl1280                     INTEGER (0..1279),
        sl2560                     INTEGER (0..2559)
    }
    duration                           INTEGER (2..2559)                       OPTIONAL,    -- Cond Setup
    monitoringSymbolsWithinSlot        BIT STRING (SIZE (14))                  OPTIONAL,    -- Need R
    frequencyDomainMonitoringLocations SEQUENCE (SIZE (1..maxNrofOffsets)) OF FreqOffset,   OPTIONAL, -- Cond Setup
    nrofCandidates                 SEQUENCE {
        aggregationLevel1              ENUMERATED {n0, n1, n2, n3, n4, n5, n6, n8},
        aggregationLevel2              ENUMERATED {n0, n1, n2, n3, n4, n5, n6, n8},
        aggregationLevel4              ENUMERATED {n0, n1, n2, n3, n4, n5, n6, n8},
        aggregationLevel8              ENUMERATED {n0, n1, n2, n3, n4, n5, n6, n8},
        aggregationLevel16             ENUMERATED {n0, n1, n2, n3, n4, n5, n6, n8}
    }                                                                          OPTIONAL,    -- Cond Setup
    ...
}

FreqOffset ::=              INTEGER (0.. maxNrofPhysicalResourceBlocks-1)
```

FIGURE 20A

```
SearchSpace ::=            SEQUENCE {
    searchSpaceId              SearchSpaceId,
    controlResourceSetId       ControlResourceSetId                    OPTIONAL,   -- Cond SetupOnly
    monitoringSlotPeriodicityAndOffset  CHOICE {
        sl1                        NULL,
        sl2                        INTEGER (0..1),
        sl4                        INTEGER (0..3),
        sl5                        INTEGER (0..4),
        sl8                        INTEGER (0..7),
        sl10                       INTEGER (0..9),
        sl16                       INTEGER (0..15),
        sl20                       INTEGER (0..19),
        sl40                       INTEGER (0..39),
        sl80                       INTEGER (0..79),
        sl160                      INTEGER (0..159),
        sl320                      INTEGER (0..319),
        sl640                      INTEGER (0..639),
        sl1280                     INTEGER (0..1279),
        sl2560                     INTEGER (0..2559)
    },
    duration                                                           OPTIONAL,   -- Cond Setup
    monitoringSymbolsWithinSlot    INTEGER (2..2559)                   OPTIONAL,   -- Need R
    frequencyDomainMonitoringLocationsAndNrofCandidates  BIT STRING (SIZE (14))   OPTIONAL,   -- Cond Setup
        SEQUENCE (SIZE (1..maxNrofCandidates)) OF SEQUENCE {
            FreqOffset,                    OPTIONAL,
            nrofCandidatesWithOffset       SEQUENCE {
                aggregationLevel1              ENUMERATED {n0, n1, n2, n3, n4, n5, n6, n8},
                aggregationLevel2              ENUMERATED {n0, n1, n2, n3, n4, n5, n6, n8},
                aggregationLevel4              ENUMERATED {n0, n1, n2, n3, n4, n5, n6, n8},
                aggregationLevel8              ENUMERATED {n0, n1, n2, n3, n4, n5, n6, n8},
                aggregationLevel16             ENUMERATED {n0, n1, n2, n3, n4, n5, n6, n8}
                                                                       OPTIONAL
            }
    nrofCandidates    SEQUENCE {
        aggregationLevel1              ENUMERATED {n0, n1, n2, n3, n4, n5, n6, n8},
        aggregationLevel2              ENUMERATED {n0, n1, n2, n3, n4, n5, n6, n8},
        aggregationLevel4              ENUMERATED {n0, n1, n2, n3, n4, n5, n6, n8},
        aggregationLevel8              ENUMERATED {n0, n1, n2, n3, n4, n5, n6, n8},
        aggregationLevel16             ENUMERATED {n0, n1, n2, n3, n4, n5, n6, n8}
    }                                                                  OPTIONAL,   -- Cond Setup
    ...
}

FreqOffset ::=             INTEGER (0..maxNrofPhysicalResourceBlocks-1)
```

FIGURE 20B

```
-- ASN1START
-- TAG-CONTROLRESOURCESET-START

ControlResourceSet ::=          SEQUENCE {
    controlResourceSetId            ControlResourceSetId, frequencyDomainResources        BIT STRING (SIZE (45)),
    frequencyDomainOffsets          SEQUENCE (SIZE (1..maxNrofOffsets)) OF FreqOffset,                          OPTIONAL,
    duration                        INTEGER (1..maxCoReSetDuration),
    cce-REG-MappingType             CHOICE {
        interleaved                     SEQUENCE {
            reg-BundleSize                  ENUMERATED {n2, n3, n6},
            interleaverSize                 ENUMERATED {n2, n3, n6},
            shiftIndex                      INTEGER(0..maxNrofPhysicalResourceBlocks-1)         OPTIONAL  -- Need S
        },
        nonInterleaved                  NULL
    },
    precoderGranularity             ENUMERATED {sameAsREG-bundle, allContiguousRBs},
    tci-StatesPDCCH-ToAddList       SEQUENCE(SIZE (1..maxNrofTCI-StatesPDCCH)) OF TCI-StateId OPTIONAL,  -- Cond NotSIB1-
initialBWP
    tci-StatesPDCCH-ToReleaseList   SEQUENCE(SIZE (1..maxNrofTCI-StatesPDCCH)) OF TCI-StateId OPTIONAL,  -- Cond NotSIB1-
initialBWP
    tci-PresentInDCI                ENUMERATED {enabled}                                       OPTIONAL,  -- Need S
    pdcch-DMRS-ScramblingID         INTEGER (0..65535)                                         OPTIONAL,  -- Need S
    ...
}

FreqOffset ::=                  INTEGER (0.. maxNrofPhysicalResourceBlocks-1)

-- TAG-CONTROLRESOURCESET-STOP
-- ASN1STOP
```

FIGURE 20C

```
SearchSpace ::=            SEQUENCE {
    searchSpaceId              SearchSpaceId,
    controlResourceSetId       ControlResourceSetId                              OPTIONAL,    -- Cond SetupOnly
    monitoringSlotPeriodicityAndOffset  CHOICE {
        sl1                        NULL,
        sl2                        INTEGER (0..1),
        sl4                        INTEGER (0..3),
        sl5                        INTEGER (0..4),
        sl8                        INTEGER (0..7),
        sl10                       INTEGER (0..9),
        sl16                       INTEGER (0..15),
        sl20                       INTEGER (0..19),
        sl40                       INTEGER (0..39),
        sl80                       INTEGER (0..79),
        sl160                      INTEGER (0..159),
        sl320                      INTEGER (0..319),
        sl640                      INTEGER (0..639),
        sl1280                     INTEGER (0..1279),
        sl2560                     INTEGER (0..2559)
    }
    duration                   INTEGER (2..2559)                                 OPTIONAL,    -- Cond Setup
    monitoringSymbolsWithinSlot  BIT STRING (SIZE (14))                          OPTIONAL,    -- Need R
    monitoringFrequencyDomainOffsets  BIT STRING (SIZE (maxNrofOffsets)),        OPTIONAL,    -- Cond Setup
    nrofCandidates             SEQUENCE {
        aggregationLevel1          ENUMERATED {n0, n1, n2, n3, n4, n5, n6, n8},
        aggregationLevel2          ENUMERATED {n0, n1, n2, n3, n4, n5, n6, n8},
        aggregationLevel4          ENUMERATED {n0, n1, n2, n3, n4, n5, n6, n8},
        aggregationLevel8          ENUMERATED {n0, n1, n2, n3, n4, n5, n6, n8},
        aggregationLevel16         ENUMERATED {n0, n1, n2, n3, n4, n5, n6, n8}
    }                                                                            OPTIONAL,    -- Cond Setup
    ...
}
```

FIGURE 20D

CONTROL CHANNEL CONFIGURATION FOR UNLICENSED WIDEBAND RADIO SYSTEMS

PRIORITY

This nonprovisional application is a U.S. National Stage Filing under 35 U.S.C. § 371 of International Patent Application Serial No. PCT/EP2020/077071 filed Sep. 28, 2020 and entitled "CONTROL CHANNEL CONFIGURATION FOR UNLICENSED WIDEBAND RADIO SYSTEMS" which claims priority to U.S. Provisional Patent Application No. 62/910,946 filed Oct. 4, 2019 both of which are hereby incorporated by reference in their entirety.

TECHNICAL FIELD

Certain embodiments of the present disclosure relate to radio systems and, more particularly, to control channel configuration for unlicensed wideband radio systems.

BACKGROUND

Mobile broadband will continue to drive the demands for big overall traffic capacity and huge achievable end-user data rates in the wireless access network. Several scenarios in the future will require data rates of up to 10 Gbps in local areas. These demands for very high system capacity and very high end-user date rates can be met by networks with distances between access nodes ranging from a few meters in indoor deployments up to roughly 50 meters in outdoor deployments, with an infra-structure density considerably higher than the densest networks of today. This disclosure refers to such networks as new radio (NR) systems. NR is currently being studied by the third generation partnership project (3GPP). Besides traditional licensed exclusive bands, NR systems are also expected to be operating on unlicensed bands especially for enterprise solutions.

Numerology and Bandwidth Consideration for NR

Multiple numerologies are supported in NR. A numerology is defined by sub-carrier spacing and cyclic prefix (CP) overhead. Multiple subcarrier spacings can be derived by scaling a basic subcarrier spacing by an integer $2^n$. The numerology used can be selected independently of the frequency band although it is assumed not to use a very small subcarrier spacing at very high carrier frequencies. Flexible network and user equipment (UE) channel bandwidth is supported.

From the perspective of a specification for Radio Access Network 1 (RAN1), the maximum channel bandwidth per NR carrier is 400 MHz in release 15 (Rel-15). Note that all details for channel bandwidth at least up to 100 MHz per NR carrier are to be specified in Rel-15. At least for the single numerology case, candidates of the maximum number of subcarriers per NR carrier is 3300 or 6600 in Rel-15 from a RAN1 specification perspective. NR channel designs should consider potential future extension of these parameters in later releases, allowing Rel-15 UEs to have access to NR network on the same frequency band in later release.

A subframe duration is fixed to 1 ms and frame length is 10 ms. Scalable numerology should allow at least from 15 kHz to 480 kHz subcarrier spacing. All numerologies with 15 kHz and larger subcarrier spacing, regardless of CP overhead, align on symbol boundaries every 1 ms in NR carrier. More specifically, for the normal CP family, the following is adopted.

For subcarrier spacing of 15 kHz*2n (n is non-negative integer),
  Each symbol length (including CP) of 15 kHz subcarrier spacing equals the sum of the corresponding 2n symbols of the scaled subcarrier spacing.
  Other than the first orthogonal frequency-division multiplexing (OFDM) symbol in every 0.5 ms, all OFDM symbols within 0.5 ms have the same size
  The first OFDM symbol in 0.5 ms is longer by 16 $T_s$ (assuming 15 kHz and fast Fourier transform (FFT) size of 2048) compared to other OFDM symbols. 16 $T_s$ is used for CP for the first symbol.
For subcarrier spacing of 15 kHz*2n (n is a negative integer)
  Each symbol length (including CP) of the subcarrier spacing equals the sum of the corresponding 2n symbols of 15 kHz.

Multi-Channel UL Transmission for Enhanced LAA (eLAA)

The baseline for licensed assisted access (LAA) uplink (UL) multicarrier operation is the extension of the single carrier operation when the eNB schedules physical uplink shared channel (PUSCH) transmissions on multiple carriers. The listen-before-talk (LBT) type on each carrier is signaled to the UE via corresponding UL grant.

Moreover, a UE that has received UL grants on a set of carriers scheduled with Cat. 4 LBT with the same starting point in the subframe on all carriers can switch to a 25 μs LBT immediately before transmission on a carrier in the set if Cat. 4 LBT has successfully completed on a designated carrier in the set. The UE must select one carrier uniformly randomly among the carriers that were scheduled with Cat. 4 LBT as the designated carrier prior to starting the Cat. 4 LBT procedure on any of the carriers in the set.

FIG. 1 shows that different transportation blocks (TB) are generated for each carrier and subframe when LBT is successful in multiple channels according to the abovementioned rules. It is clear that guard band is available for each carrier. This is because of a limitation from Long Term Evolution (LTE) technology (LTE supported a maximum bandwidth of 20 MHz).

Multi-Channel UL Transmission for Wi-Fi

Unlike eLAA, Wi-Fi (such as 802.11n, 802.11ac, etc.) defines a new, wider channel other than 20 MHz. As shown in FIG. 2, 40 MHz could bring more usable subcarriers than simple aggregation of two 20 MHz channels. The benefit comes from two aspects: 1) guard band decrease, and 2) pilot subcarrier overhead savings. A wider channel could bring higher spectrum efficiency.

Before transmitting a 40 MHz frame, a station is responsible for ensuring that the entire 40 MHz channel is clear. Clear-channel assessment is performed on the primary channel according to the well-understood rules for transmission on an 802.11 channel. Even if a device intends to transmit a 40 MHz frame, the slot boundaries and timing are based on access to the primary channel only. The secondary channel must be idle during the priority interframe space before it may be used as part of a 40 MHz transmission. In Wi-Fi, the UE decides when and how to transmit UL data itself based on LBT results, i.e. 20 MHz and 40 MHz transmission.

NR Wideband Operation and LBT Bandwidth Pieces

Similar to NR, it is expected that NR-U will support transmissions with wide bandwidth, e.g., up to several hundreds of MHz bandwidth. However, there could be different radio technologies with different device capabilities that simultaneously share the same spectrum. It is unlikely that a device will sense the channel free over the whole wide bandwidth, especially at high load. Thus, it is beneficial for NR-U to support transmissions with dynamic bandwidth, in which the device can decide which part(s) of the supported bandwidth to use based on its LBT outcome.

There are two common approaches for the device to use in wideband transmissions: carrier aggregation (CA) and single carrier wideband transmissions. In CA transmissions (similar to LTE-based LAA), the device performs LBT per component carrier (of, e.g., 20 MHz), then transmits on each component carrier (CC) in which LBT is successful. In single carrier wideband transmissions, the device performs LBT per LBT bandwidth piece (of 20 MHz) (also called an LBT bandwidth or LBT sub-band) and aggregates resources from each free LBT bandwidth piece in a single physical shared channel (SCH). FIG. 3 shows an example of wideband operations using CA and single system carrier bandwidth of 80 MHz. Different UEs may operate on different maximum bandwidth sizes and transmit with different number of resource blocks (RBs) depending on their LBTs outcomes.

The diagrams in FIG. 3 consider only 80 MHz bandwidth; however, wideband operation can span more than 80 MHz through configuration of additional component carriers, either 20 MHz or wider, and the same principles as described above apply.

In principle, if a large number of Control Resource Sets (CORESETs) can be configured, then separate CORESETs and search spaces need to be configured for different LBT bandwidth pieces to ensure the availability of control signalling when at least one LBT bandwidth piece is available. In the example shown in FIG. 3(b), UE2 needs to monitor both CORESET2 and CORESET3 since the channel may be available only in LBT bandwidth piece 2 or only in LBT bandwidth piece 3. Similarly, UE3 shall monitor all four CORESETs to get its PDCCH. Furthermore, it is undesirable to configure a wide CORESET across LBT bandwidth pieces. Either the PDCCH is interleaved across the LBT bandwidth pieces or all PDCCH candidates are located in the available LBT bandwidth pieces when part of the channel is busy. Both results in loss of scheduling opportunities. Hence, there is no fundamental difference between the CA and wide bandwidth part (BWP) approaches in terms of number of CORESETs and search spaces to monitor by the UE. There is one difference, however, and that is with respect to UE capability. In 3GPP NR Release 15 (Rel-15), only up to 3 CORESETs can be configured, which puts a limit on the number of locations in the frequency domain that the UE can monitor for physical downlink control channel (PDCCH).

NR CORESET Configuration

Among other things, a control resource set defines (1) the time duration (in OFDM symbols) of the CORESET which determines the time duration occupied by PDCCH and, (2) the frequency domain resources occupied by PDCCH. The current Rel-15 radio resource control (RRC) configuration includes the following:

controlResourseSetId: ID of the CORSET
frequencyDomainResources: A bitmap indicating which groups of 6 contiguous PRBs (RB groups) are allocated within a bandwidth part, i.e., the frequency domain resources used for PDCCH. An RB group of 6 physical resource blocks (PRBs) is also referred to as a control channel element (CCE).
duration: The number of OFDM symbols in a CORESET, i.e. the time domain resources used for PDCCH
[other . . . ]

NR PDCCH SearchSpace Configuration

PDCCHs are organized as SearchSpaces and each search space is associated with the CORESET. The current RRC configuration includes the following:

controlResourceSetId: reference to the associated CORESET for the SearchSpace
monitoringSlotPeriodicityAndOffset: Slots for PDCCH Monitoring configured as periodicity and offset.
duration: Number of consecutive slots that a SearchSpace lasts in every time domain monitoring occasion, i.e., upon every period as given in the periodicityAndOffset.
monitoringSymbolsWithinSlot: Symbols for PDCCH monitoring in the slots configured for PDCCH monitoring (see monitoringSlotPeriodicityAndOffset). The most significant (left) bit represents the first OFDM symbol in a slot.
nrofCandidates: Number of PDCCH candidates per aggregation level.
searchSpaceType: Indicates whether this is a common search space (present) or a UE specific search space as well as downlink control information (DCI) formats for which to monitor.

Search Space Configuration for Wideband Operation

As mentioned above, NR supports up to 100 MHz carrier bandwidth in Rel-15. It is natural that NR-U will support such wideband carriers in order to increase system capacity. LBT, however, is typically performed in LBT bandwidth pieces (LBT sub-bands) of 20 MHz, similar to Wi-Fi.

When one NR-U base station (a base station is referred to as gNB in NR) operating with a whole bandwidth that spans multiple LBT bandwidth pieces (e.g. one LBT bandwidth piece is 20 MHz in 5 GHz band), the gNB shall perform LBT in multiple LBT bandwidth pieces. Based on the LBT results, part of the carrier bandwidth may be unavailable due to use by other systems (e.g., Wi-Fi) using the unlicensed channels. Due to the nature of unlicensed spectrum, there is a high likelihood that multiple radio systems are active in transmissions, such that the NR-U spectrum may only be partially available.

With only partial availability of the LBT bandwidth pieces (also called LBT bandwidths, LBT sub-bands, or just sub-bands herein), a mechanism is needed for the gNB to be able to transmit and the UE to decode PDCCH candidates in each sub-band to be able to receive scheduled data transmissions in those available sub-bands. One approach is to configure one CORESET and search spaces associated with that CORESET per sub-band. However, as mentioned above, in Rel-15, there is a limit to the number of CORSETS than can be configured per serving cell (carrier) (Rel-15 only supports maximum 3 per carrier). Hence an alternate mechanism is needed to configure PDCCH candidates in all sub-bands of a wideband carrier.

One example of such an alternate mechanism is as follows. In current NR specs, a UE supports up to 3 CORESETs per BWP. To support very wide BWP available in the unlicensed band (up to 160 MHz or 320 MHz), the current 3 CORESET limit presents a significant hurdle for NR-U to utilize wide spectrum efficiently.

PDCCH search spaces for different LBT bandwidth pieces (sub-bands) can be configured by making a frequency domain translation of a CORESET defined for an LBT bandwidth piece. A nonlimiting example is illustrated in FIG. 4.

CORESET with frequency resources located within LBT bandwidth piece (sub-band) 1.
PDCCH SearchSpace1 for LBT bandwidth piece (sub-band) 1 can be configured based on existing NR specs.

PDCCH SearchSpace2, SearchSpace3 and SearchSpace4 for LBT bandwidth pieces 2, 3 and 4 requires NR specs changes.

As an example, PDCCH SearchSpace2 can be configured for LBT bandwidth piece 2 by adding a new frequency offset field for NR-U SearchSpace in the RRC configuration:
monitoringFrequencyOffset: frequency offset to move the CORESET to a new frequency location
Said frequency offset can be in unit of 6 RB (as is used in definition of CORESET). Said frequency offset can be in unit of RB or RBG size to allow fine tuning of SearchSpace locations.
PDCCH SearchSpace3 and SearchSpace4 for LBT bandwidth pieces 3 and 4 can be configured similarly.

As another example, PDCCH SearchSpace1, SearchSpace2, SearchSpace3 and SearchSpace4 for LBT bandwidth pieces 1, 2, 3 and 4 can be configured by a new monitoring LBT bandwidth piece bitmap in the RRC configuration:
monitoringLBPsWithinBWP: LBT bandwidth pieces for PDCCH monitoring in the BWP configured for PDCCH monitoring. Each bit corresponding to monitoring PDCCH in the corresponding LBT bandwidth piece.

FIG. 5 shows a more detailed example. This example assumes an 80 MHz bandwidth part (BWP) assuming 30 kHz subcarrier spacing (SCS). For this scenario there are 217 resource blocks (RBs) in the BWP. In Rel-15, two indexing schemes are used for indexing resource blocks RBs. For a specific carrier, Point A defines a reference point from which common resource blocks (CRBs) are numbered starting at index 0. The second indexing scheme numbers physical resource blocks (PRBs) within a bandwidth part starting with index 0 for the first PRB within the BWP.

FIG. 5 shows an example where the BWP starts at CRB index 34. In this example, the BWP consists of four 20 MHz LBT sub-bands. In between the sub-bands, there is an intra-carrier guard (labeled/drawn in red) consisting of an integer number of RBs. The purpose of the intra-carrier guard is for the case when LBT is not successful in all LBT sub-bands and transmission occurs in only a sub-set of LBT sub-bands. No data is scheduled in the guard bands which limits the spectral emissions into adjacent 20 MHz LBT sub-band(s) that are occupied by another node (gNB or UE) or technology (e.g., WiFi) using the adjacent 20 MHz channels. In this way, adjacent channel interference and blocking is mitigated.

The blocks labeled/drawn in green illustrate 4 frequency domain (FD) monitoring occasions. FD monitoring Occasion 0 is defined by the CORSET in which 8 contiguous RB groups (control channel elements, CCEs) are configured. In Rel-15, the first CCE is constrained to start at a carrier resource block (CRB) index that is an integer multiple of 6 CRBs. Since the BWP starts at CRB 34, the next higher CRB index that is an integer multiple of 6 CRBs is 36. Each CCE consists of 6 RBs, hence FD monitoring Occasion 0 occupies 8*6=48 RBs extending from CRB 36 up to CRB 83.

FD monitoring occasions 1, 2, and 3 are defined by a translation (CRB offset) from the first CCE defined in the CORESET, i.e., the first CCE in FD monitoring occasion 0. This diagram shows that the offset is in terms of an integer number of RBs. The offsets corresponding to FD monitoring occasions 1, 2, and 3 are 54, 110, and 165 RBs, respectively. This is consistent with the above example where it is disclosed that the frequency offset can be in units of 6 RB (as is used in definition of CORESET). The frequency offset can be in units of RB or RBG size to allow fine tuning of SearchSpace locations. The example in FIG. 5 corresponds to the second option (units of RB or RBG size).

SUMMARY

There currently exist certain challenge(s). A problem with the above-described solution is that, for the case where there are limited number of PRBs available in each LBT sub-band (e.g., 50, 49, 49, and 50 for the 4 sub-bands in FIG. 5), the frequency offset configuring an FD monitoring occasion may need to be a non-integer number of CCEs in order to avoid overlaps of the FD monitoring occasions with guard bands or the end of the BWP. This is inconsistent with the way CORESETs are configured in Rel-15. This may be a problem for some UE and gNB implementations that assume PDCCH candidates are always aligned with 6-RB boundaries on the CRB grid.

Certain aspects of the present disclosure and their embodiments may provide solutions to these or other challenges. Certain embodiments of the present disclosure propose a solution that enables a frequency domain (FD) monitoring occasion within a search space to be defined using a frequency offset that is an integer number of CCEs, thus preserving the PDCCH alignment with the 6-RB boundaries of the CRB grid (see FIG. 6). Potential overlaps of the FD monitoring occasion are compensated at the UE by automatically reducing the number of configured CCEs in the case of an overlap. For example, for the overlap of FD monitoring occasion 2 in FIG. 6, the UE "automatically" reduces the number of CCEs by one to 7. Such automatic reduction is understood by both the gNB and the UE since both are aware of the position and size of the intra-carrier guardbands as well as the end of the BWP. The UE is made aware of the guards and BWP end by RRC configuration delivered from the gNB. Thus, when the gNB transmits PDCCH in a search space, it will do so on the reduced number of CCEs. At the UE side, the UE will monitor for PDCCH only on this reduced number of CCEs.

There are, proposed herein, various embodiments which address one or more of the issues disclosed herein. Certain embodiments apply to the case where a PDCCH search space is configured with multiple frequency domain monitoring locations where each monitoring location is configured by a frequency translation of the CCEs defined in the associated CORESET through a frequency offset that is an integer multiple of CCEs. In scenarios in which there are a limited number of CCEs available in, for example, multiple LBT bandwidths of a wideband carrier, the FD monitoring locations can overlap the guards between the LBT bandwidths or even extend outside the BWP. In certain embodiments, a method is performed in a UE where:

The UE automatically excludes the CCE(s) that either partially or fully overlap the guard PRBs from the set of CCEs in which the UE monitors PDCCH candidates, and/or The UE automatically excludes the CCE(s) that either partially or fully extend outside the configured BWP from the set of CCEs in which the UE monitors PDCCH candidates.

According to certain embodiments, a method performed by a wireless device comprises determining a subset of a set of CCEs to monitor within one or more frequency domain monitoring occasions. The subset of CCEs excludes any CCEs of the set of CCEs that partially or fully overlap one or more guard PRBs. The method comprises monitoring the determined subset of CCEs for one or more control channel candidates within the frequency domain monitoring occasion(s).

According to certain embodiments, a computer program comprises instructions which when executed on a computer perform a method comprising determining a subset of a set of CCEs to monitor within one or more frequency domain monitoring occasions and monitoring the determined subset of CCEs for one or more control channel candidates within the frequency domain monitoring occasion(s). The subset of CCEs excludes any CCEs of the set of CCEs that partially or fully overlap one or more guard PRBs.

According to certain embodiments, a computer program product comprises a computer program, the computer program comprising instructions which when executed on a computer perform a method comprising determining a subset of a set of CCEs to monitor within one or more frequency domain monitoring occasions and monitoring the determined subset of CCEs for one or more control channel candidates within the frequency domain monitoring occasion(s). The subset of CCEs excludes any CCEs of the set of CCEs that partially or fully overlap one or more guard PRBs.

According to certain embodiments, a non-transitory computer readable medium stores instructions which when executed by a computer perform a method comprising determining a subset of a set of CCEs to monitor within one or more frequency domain monitoring occasions and monitoring the determined subset of CCEs for one or more control channel candidates within the frequency domain monitoring occasion(s). The subset of CCEs excludes any CCEs of the set of CCEs that partially or fully overlap one or more guard PRBs.

According to certain embodiments, a wireless device comprises a memory and processing circuitry. The memory is operable to store instructions. The processing circuitry is operable to execute the instructions to cause the wireless device to determine a subset of a set of CCEs to monitor within one or more frequency domain monitoring occasions and to monitor the determined subset of CCEs for one or more control channel candidates within the frequency domain monitoring occasion(s). The subset of CCEs excludes any CCEs of the set of CCEs that partially or fully overlap one or more guard PRBs.

Each of the above-described method, computer program, computer program product, non-transitory computer readable medium, and/or wireless device may include other suitable features, such as one or more of the following features:

In some embodiments, the set of CCEs correspond to a search space. The search space comprises frequency domain monitoring locations that the wireless device monitors for a control channel. The search space is determined based on a frequency translation of CCEs defined in an associated CORESET. The frequency translation is based on a frequency offset that is an integer multiple of CCEs.

In some embodiments, determining the subset of CCEs to monitor within the frequency domain monitoring occasion(s) comprises determining, by the wireless device, the CCEs that partially or fully overlap one or more of the guard PRBs and automatically excluding the CCEs that the wireless device has determined partially or fully overlap one or more of the guard PRBs from the subset of CCEs to monitor within the frequency domain monitoring occasion(s). In some embodiments, automatically excluding the CCEs that the wireless device has determined partially or fully overlap one or more of the guard PRBs comprises monitoring all of the CCEs associated with a subband for which the PRBs of a CORESET do not overlap with any of the guard PRBs and monitoring fewer than all of the CCEs associated with a subband for which the PRBs of a CORESET overlaps with one or more of the guard PRBs.

In some embodiments, determining the subset of CCEs to monitor within the frequency domain monitoring occasion(s) comprises determining, by the wireless device, one or more CCE fractions that partially or fully overlap one or more of the guard PRBs and automatically excluding the one or more CCE fractions that the wireless device has determined partially or fully overlap one or more of the guard PRBs from the subset of CCEs or CCE fractions to monitor within the frequency domain monitoring occasion(s). Each CCE fraction comprises an integer number of REG bundles associated with one of the CCEs, each REG bundle comprising a plurality of contiguous REGs.

In some embodiments, determining the subset of CCEs to monitor within the frequency domain monitoring occasion(s) comprises shrinking an original size of a CORESET to exclude the one or more CCEs or CCE fractions that partially or fully overlap one or more of the guard PRBs.

In some embodiments, the search space is determined based on an original size of the CORESET and excluding any CCEs that partially or fully overlap one or more of the guard PRBs comprises excluding a control channel candidate or skipping a control channel.

In some embodiments, determining the subset of CCEs to monitor within the frequency domain monitoring occasion(s) comprises monitoring a lower aggregation level than an aggregation level that would make use of one or more CCEs that partially or fully overlap one or more of the guard CCEs.

In some embodiments, determining the subset of CCEs to monitor within the frequency domain monitoring occasion(s) comprises skipping monitoring of a control channel candidate for which frequency resources corresponding to that control channel candidate fully or partially overlap one or more of the guard PRBs.

In some embodiments, a reference point for CRB index zero is configured to minimize a number of the CCEs that partially or fully overlap one or more of the guard PRBs for a respective carrier.

In some embodiments, determining the subset of CCEs to monitor within the frequency domain monitoring occasion(s) comprises receiving a frequency domain monitoring locations configuration from the network node, the frequency domain monitoring locations configuration indicating which set(s) of RBs shall be monitored for control channel candidates, wherein each set of RBs corresponds to PRBs of the frequency domain monitoring occasion(s) and does not overlap any of the guard PRBs.

In some embodiments, the frequency domain monitoring locations configuration comprises a bitmap that indicates which set(s) of RBs to monitor.

In some embodiments, the frequency domain monitoring locations configuration is received in a search space configuration field.

In some embodiments, the configuration of sets of RBs is received in a parameter configured outside of the search space configuration field.

In some embodiments, the configuration of a set(s) of RBs comprises an index of the starting RB and a number of RBs for each set of RBs.

According to certain embodiments, a method performed by a network node comprises determining a subset of a set of CCEs available to transmit a control channel and transmitting the control channel using one or more CCEs of the subset of CCEs available to transmit the control channel. The subset of CCEs excludes any CCEs of the set of CCEs that partially or fully overlap one or more guard PRBs.

According to certain embodiments, a computer program comprises instructions which when executed on a computer perform a method comprising determining a subset of a set of CCEs available to transmit a control channel and transmitting the control channel using one or more CCEs of the subset of CCEs available to transmit the control channel. The subset of CCEs excludes any CCEs of the set of CCEs that partially or fully overlap one or more guard PRBs.

According to certain embodiments, a computer program product comprises a computer program, the computer program comprising instructions which when executed on a computer perform a method comprising determining a subset of a set of CCEs available to transmit a control channel and transmitting the control channel using one or more CCEs of the subset of CCEs available to transmit the control channel. The subset of CCEs excludes any CCEs of the set of CCEs that partially or fully overlap one or more guard PRBs.

According to certain embodiments, a non-transitory computer readable medium stores instructions which when executed by a computer perform a method comprising determining a subset of a set of CCEs available to transmit a control channel and transmitting the control channel using one or more CCEs of the subset of CCEs available to transmit the control channel. The subset of CCEs excludes any CCEs of the set of CCEs that partially or fully overlap one or more guard PRBs.

According to certain embodiments, a network node comprises memory and processing circuitry. The memory is operable to store instructions. The processing circuitry is operable to execute the instructions to cause the network node to determine a subset of a set of CCEs available to transmit a control channel, and the network node is operable to transmit the control channel using one or more CCEs of the subset of CCEs available to transmit the control channel. The subset of CCEs excludes any CCEs of the set of CCEs that partially or fully overlap one or more guard PRBs.

Each of the above-described method, computer program, computer program product, non-transitory computer readable medium, and/or network node may include other suitable features, such as one or more of the following features:

In some embodiments, the set of CCEs correspond to a search space of a wireless device. The search space comprises frequency domain monitoring locations that the wireless device monitors for the control channel. The search space is based on a frequency translation of CCEs defined in an associated CORESET. The frequency translation is based on a frequency offset that is an integer multiple of CCEs.

In some embodiments, determining the subset of CCEs comprises determining the CCEs that partially or fully overlap one or more of the guard PRBs and automatically excluding the CCEs that partially or fully overlap one or more of the guard PRBs from the subset of CCEs.

In some embodiments, the subset of CCEs comprises all of the CCEs associated with a subband for which the PRBs of a CORESET do not overlap with any of the guard PRBs, and the subset of CCEs comprises fewer than all of the CCEs associated with a subband for which the PRBs of a CORESET overlaps with one or more of the guard PRBs.

In some embodiments, determining the subset of CCEs comprises determining one or more CCE fractions that partially or fully overlap one or more of the guard PRBs and automatically excluding the one or more CCE fractions that partially or fully overlap one or more of the guard PRBs from the subset of CCEs or CCE fractions available to transmit the control channel. Each CCE fraction comprises an integer number of REG bundles associated with one of the CCEs, each REG bundle comprising a plurality of contiguous REGs.

In some embodiments, determining the subset of CCEs comprises shrinking an original size of a CORESET to exclude the one or more CCEs or CCE fractions that partially or fully overlap one or more of the guard PRBs.

In some embodiments, the search space is determined based on an original size of the CORESET and excluding any CCEs that partially or fully overlap one or more of the guard PRBs comprises excluding a control channel candidate or skipping a control channel.

In some embodiments, the control channel is transmitted using a lower aggregation level than an aggregation level that would make use of one or more CCEs that partially or fully overlap one or more of the guard CCEs.

In some embodiments, determining the subset of CCEs comprises skipping (not including) a control channel candidate for which frequency resources corresponding to that control channel candidate fully or partially overlap one or more of the guard PRBs.

In some embodiments, a reference point for CRB index zero is configured to minimize a number of the CCEs that partially or fully overlap one or more of the guard PRBs for a respective carrier.

Some embodiments further comprise sending a frequency domain monitoring locations configuration to a wireless device. The frequency domain monitoring locations configuration indicates which set(s) of RBs shall be monitored for control channel candidates. Each set of RBs corresponds to PRBs of one or more frequency domain monitoring occasion(s) and does not overlap any of the guard PRBs.

In some embodiments, the frequency domain monitoring locations configuration comprises a bitmap that indicates which set(s) of RBs to monitor.

In some embodiments, the frequency domain monitoring locations configuration is sent in a search space configuration field.

In some embodiments, the configuration of sets of RBs is sent from the network node to the wireless device in a parameter configured outside of the search space configuration field.

In some embodiments, the configuration of a set(s) of RBs comprises an index of the starting RB and a number of RBs for each set of RBs.

Certain embodiments may provide one or more of the following technical advantage(s). For example, certain embodiments enable control channel configuration in a wideband carrier (>20 MHz) that enables PDCCH candidates within an FD monitoring location configured within a search space to be aligned to 6-RB boundaries on the CRB grid. Preserving this property is advantageous from an implementation standpoint allowing reuse of software/hardware that takes advantage of this property. Moreover, it allows maximizing the number of CCEs available in each frequency domain monitoring location, while compensating for potential overlaps with the intra-carrier guards.

BRIEF DESCRIPTION OF THE DRAWINGS

For a more complete understanding of the disclosed embodiments and their features and advantages, reference is now made to the following description, taken in conjunction with the accompanying drawings, in which:

FIGS. 20A-20D illustrate examples of parameters that may be used to configure a wireless device.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In the description herein, a resource element group (REG) is defined as 12 subcarriers*1 OFDM symbol. Sometimes, this is loosely referred to as a resource block (RB) or physical resource block (PRB) or common resource block (CRB). A REG bundle is defined as either 2, 3, or 6 contiguous (in frequency) REGs. A REG bundle defines the precoder granularity and interleaving granularity for the resources in a CORESET. A CCE is defined as 6 REGs. Sometimes, this is loosely referred to as 6 RBs/PRBs/CRBs.

Embodiment #1 (CORESET Shrinkage

Figure 1:
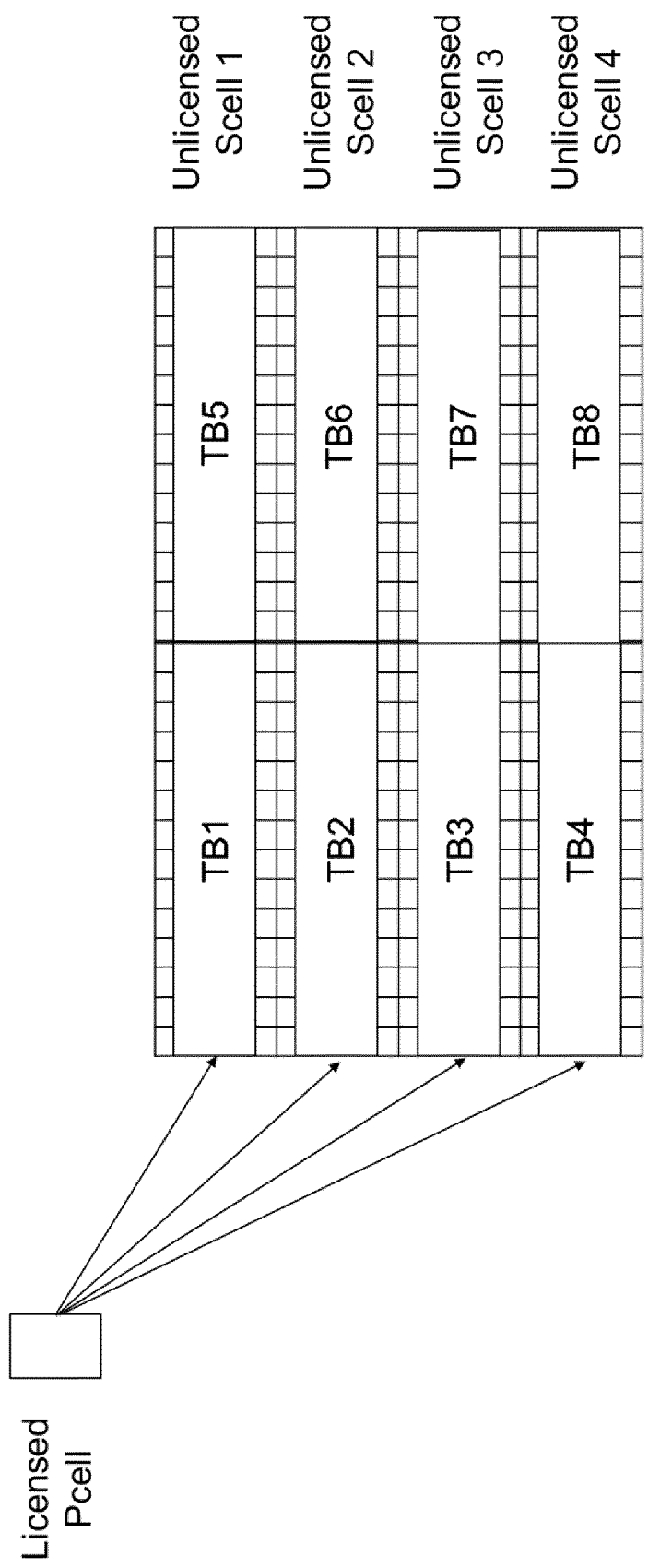
FIG. 1 illustrates examples for multi-channel UL transmission in eLAA.
Figure 2:
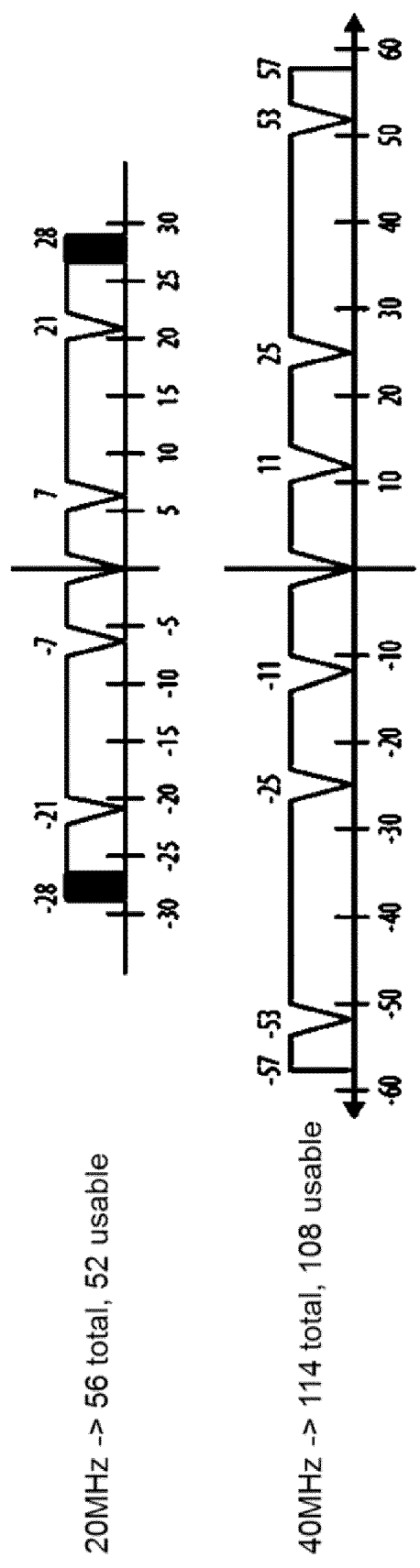
FIG. 2 illustrates 20 MHz and 40 MHz channels for 802.11n.
Figure 3:
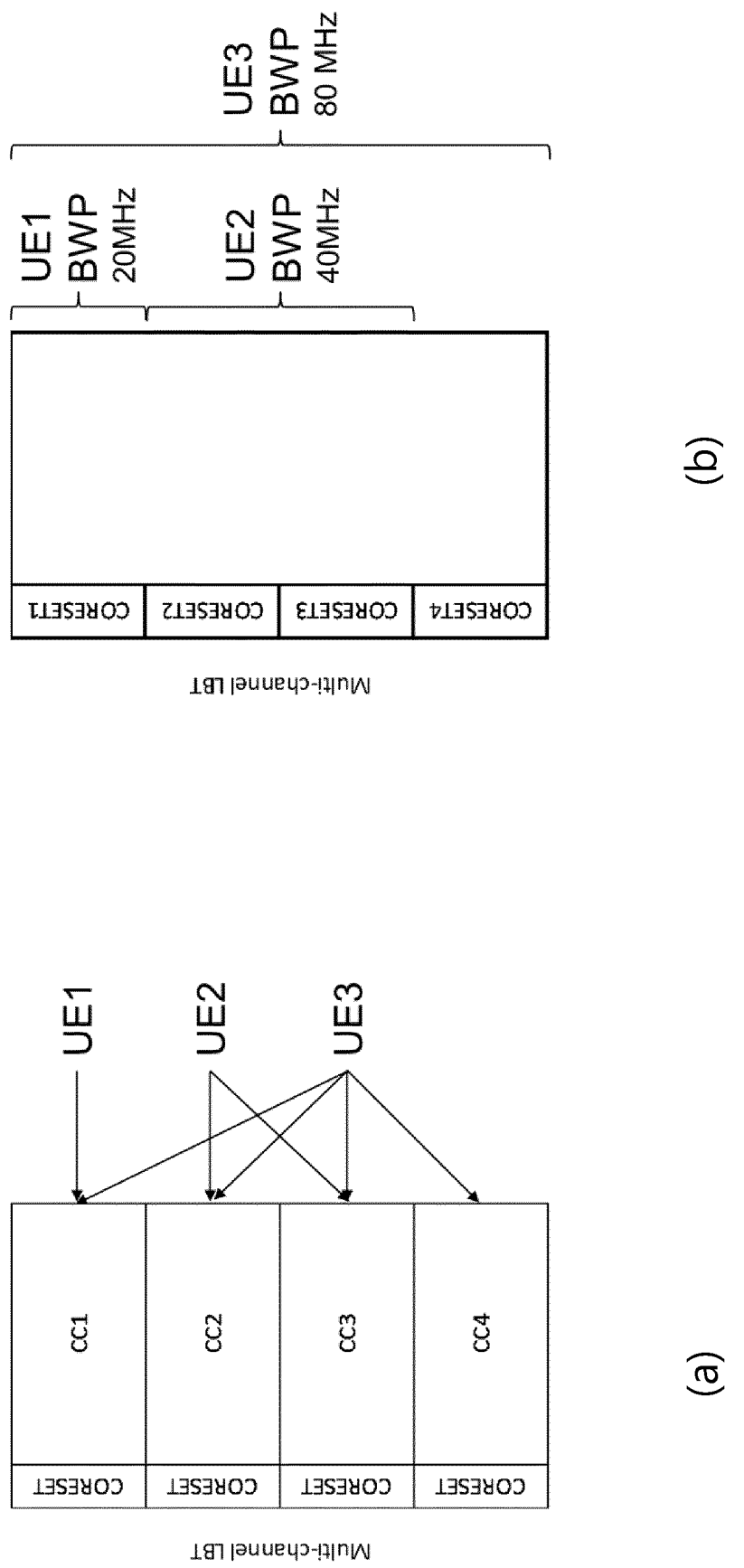
FIG. 3 illustrates CA and single carrier wideband transmissions.
Figure 4:
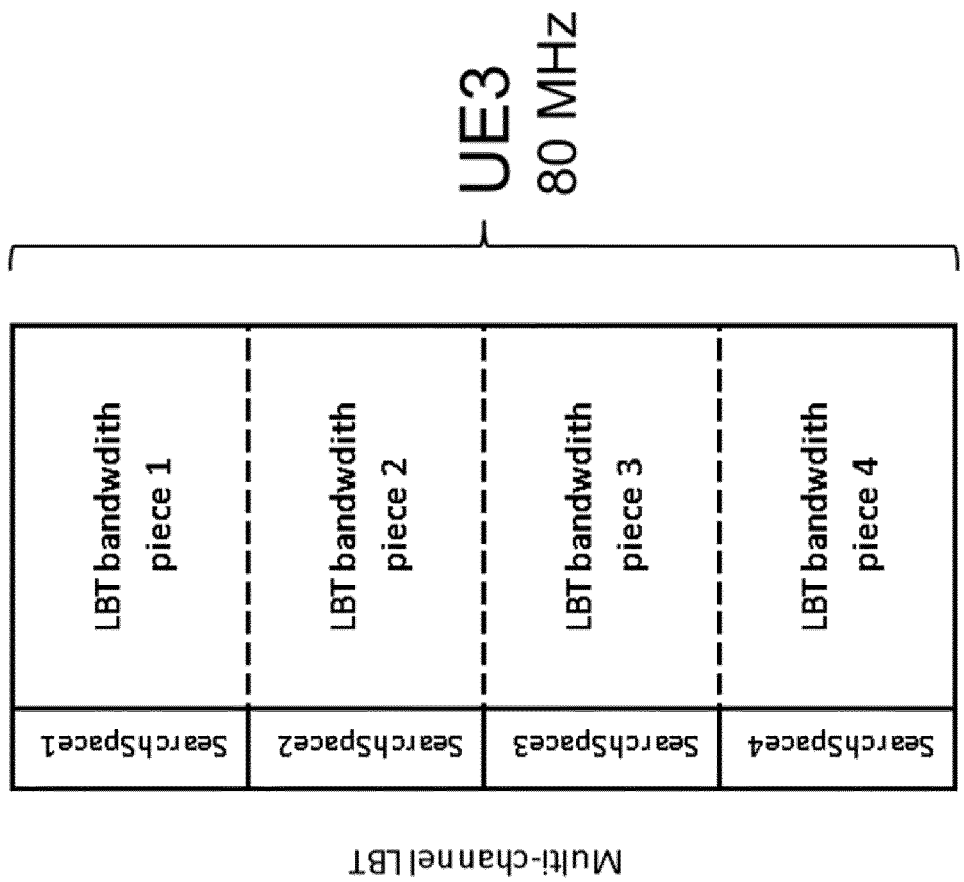
FIG. 4 illustrates multiple SearchSpaces configured from one CORESET.
Figure 5:
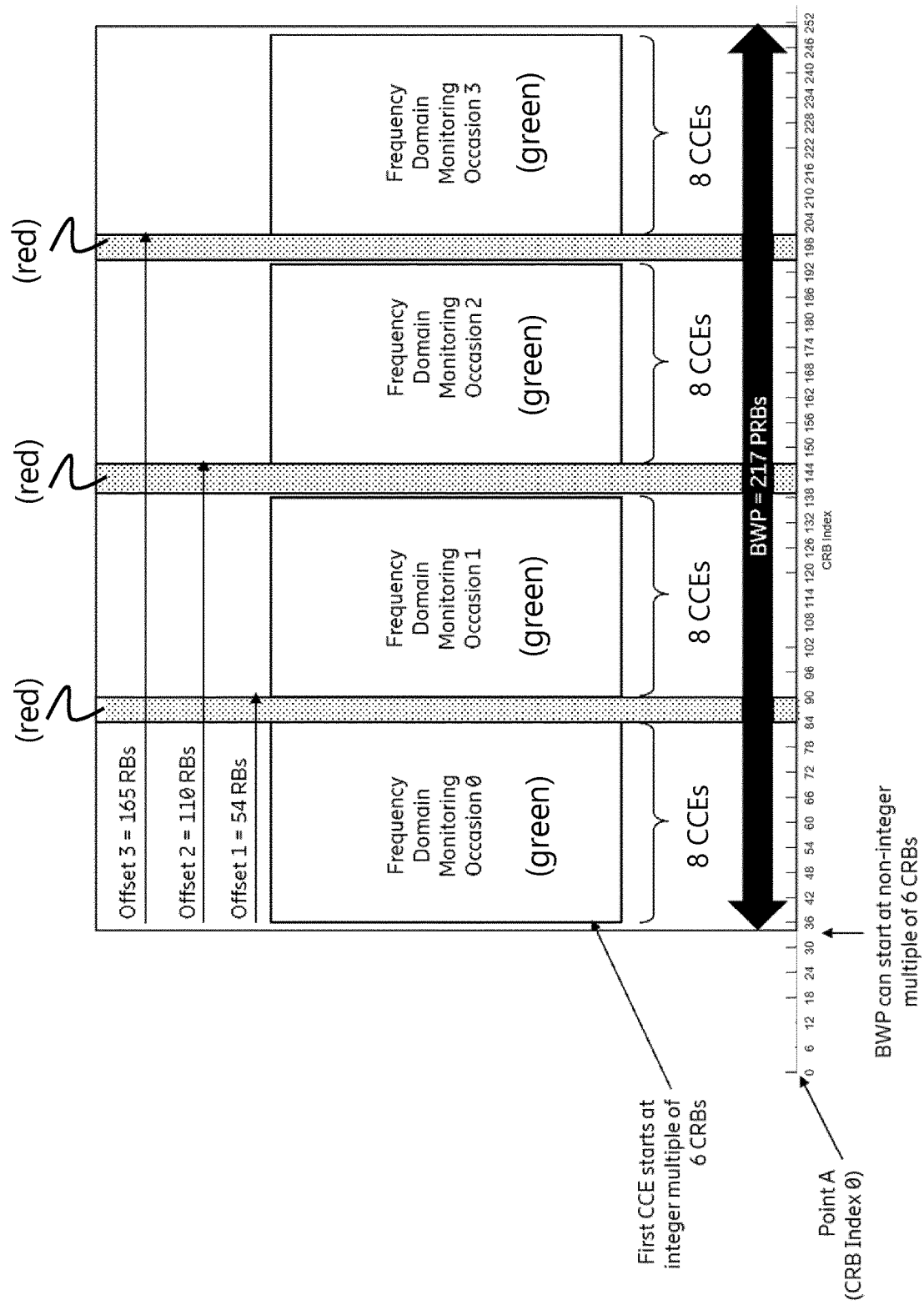
FIG. 5 illustrates frequency domain (FD) monitoring locations within a search space configured by a frequency domain translation (offset) of the CORESET. The CORESET defines FD monitoring location 0. FD monitoring locations 1, 2, and 3 are defined within a search space configuration as RB offsets from the first CCE in FD monitoring occasion 0. This example corresponds to an 80 MHz bandwidth part based on 30 kHz SCS (217 PRBs).
Figure 6:
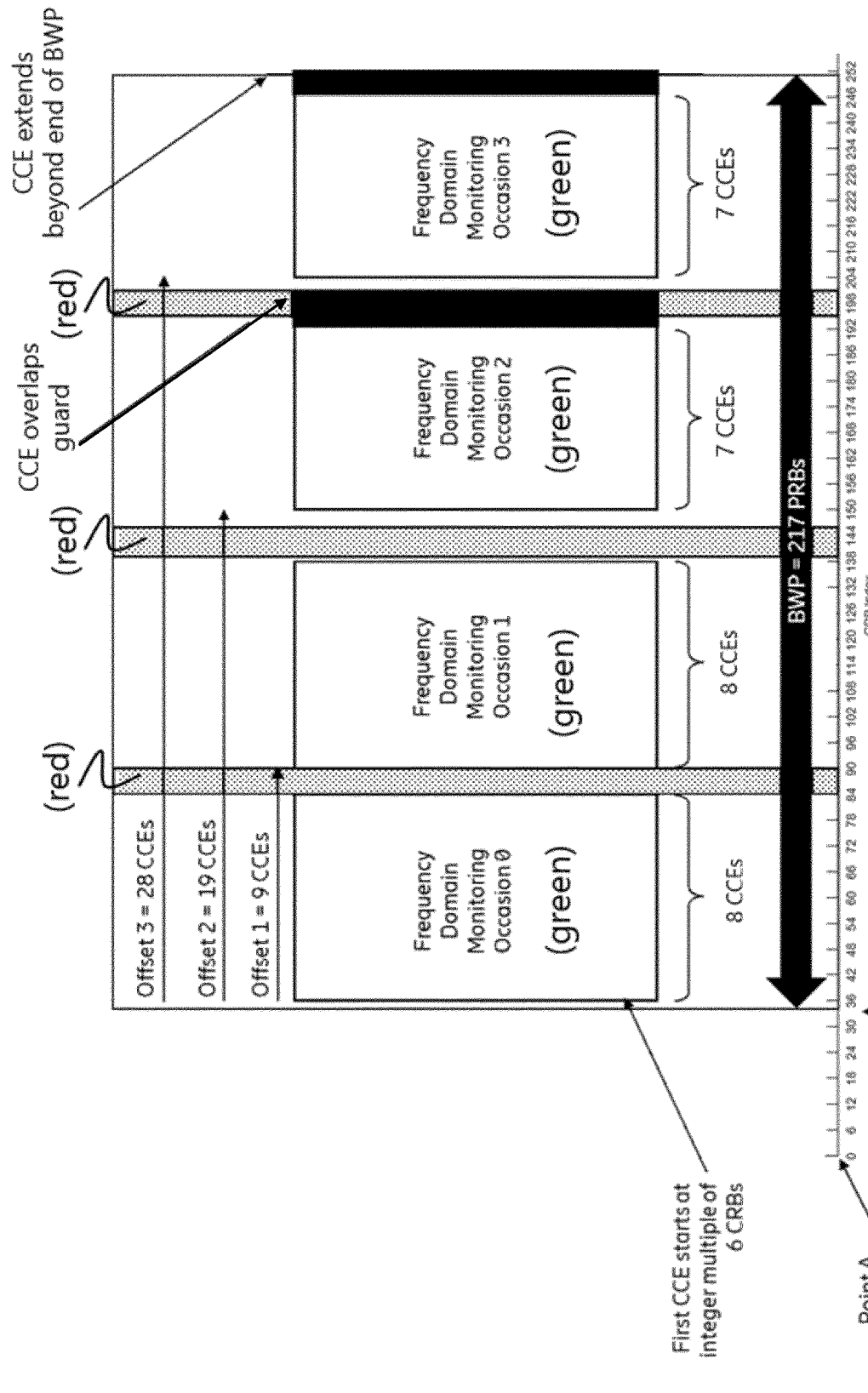
FIG. 6 illustrates an example of CORESET size shrinkage in accordance with some embodiments. The offsets defining the start of the frequency domain monitoring occasions illustrated in FIG. 6 are integer multiples of CCEs.

In a PDCCH search space configured with multiple frequency domain monitoring locations where each monitoring location is configured by a frequency translation of the CCEs defined in the associated CORESET through a frequency offset that is an integer multiple of CCEs:
  If the frequency domain monitoring occasion overlaps with a set of configured guard PRBs, the UE automatically excludes the CCE(s) that either partially or fully overlap the guard PRBs from the set of CCEs in which the UE monitors PDCCH candidates
  If the frequency domain monitoring occasion extends outside the configured BWP, the UE automatically excludes the CCE(s) that either partially or fully extend outside the configured BWP from the set of CCEs in which the UE monitors PDCCH candidates A nonlimiting example is illustrated in FIG. 6. Assume the CORESET configured in subband #1 has 8 CCEs (i.e., 48 resource element groups (REG)) in the frequency dimension and two OFDM symbols (OS) in the time dimension. The size can be denoted as 8 CCEs×2 OS.
  In subband #2, the CORESET with frequency offset does not overlap with any of the guard PRBs. Hence, the CORESET's frequency domain dimension remains 8 CCEs. The PDCCH candidates in search space for subband #2 is based on a CORESET of size 8 CCEs×2 OS.
  In subband #3, the CORESET with frequency offset overlaps with the guard PRBs. Hence, the CORESET's frequency domain dimension shrinks to 7 CCEs. The PDCCH candidates in search space for subband #3 is based on a CORESET of size 7 CCEs×2 OS.
  In subband #4, the CORESET with frequency offset exceeds the carrier bandwidth. Hence, the CORESET's frequency domain dimension shrinks to 7 CCEs. The PDCCH candidates in search space for subband #4 is based on a CORESET of size 7 CCEs×2 OS.

Embodiment #1a (CORESET Shrinkage by Fraction of a CCE

In a variation of Embodiment #1, rather than automatically excluding CCE(s) that partially/fully overlap a guard or extend outside the BWP, the UE automatically excludes a fraction of a CCE that partially/fully overlaps a guard or extends outside the BWP. The CCE fraction is an integer number of REG bundles, where a REG bundle can be 2, 3, or 6 REGs.

Embodiment #2 (PDCCH Candidate Exclusion

In a PDCCH search space configured with multiple frequency domain monitoring locations where each monitoring location is configured by a frequency translation of the CCEs defined in the associated CORESET through a frequency offset that is an integer multiple of CCEs:
  If the frequency domain monitoring occasion overlaps with a set of configured guard PRBs or extends outside the configured BWP, and
  If the UE is configured with a PDCCH aggregation level that would make use of CCEs that partially/fully overlap the guard PRBs or partially/fully extend outside the BWP, the UE is not expected to receive PDCCH at that aggregation level and instead monitors PDCCH with a lower aggregation level Different than embodiment 1, the CORESET dimension after frequency offset is not modified. PDCCH candidate positions are still calculated based on the original CORESET sizes. However, the PDCCH candidates that need unavailable resources (either the guard PRBs or outside of the carrier bandwidth) cannot be used.

Embodiment #2a (PDCCH Skipping

In a PDCCH search space configured with multiple frequency domain monitoring locations where each monitoring location is configured by a frequency translation of the CCEs defined in the associated CORESET through a frequency offset that is an integer multiple of CCEs:
  If the frequency domain monitoring occasion overlaps with a set of configured guard PRBs or extends outside the configured BWP, and
  If the UE is configured with a PDCCH candidate that that makes use of CCEs that partially/fully overlap the guard PRBs or partially/fully extend outside the BWP, the UE is not expected to receive PDCCH in resources corresponding to that PDCCH candidate.

Embodiment #3

In a PDCCH search space configured with multiple frequency domain monitoring locations where each monitoring location is configured by a frequency translation of the CCEs defined in the associated CORESET through a frequency offset that is an integer multiple of CCEs
  A method by which Point A (CRB Index 0) for the carrier is selected in order to minimize the overlap of the frequency domain monitoring location with a set of guard PRBs and/or a set of PRBs that extend outside the BWP.

Embodiment #4

In a PDCCH search space configured with multiple frequency domain monitoring locations where each monitoring location is configured by a frequency translation of the CCEs defined in the associated CORESET through a frequency offset
  Wherein the search space is configured such that the number of blind decodes performed by the UE is a function of the frequency offset.

In Embodiments #1-3, the search space configuration can be of form of FIG. 20A where the frequency offset is shown highlighted in bold or of the form in embodiment 6. In both cases, the number of PDCCH candidates per aggregation level (nrofCandidates parameter) is the same for each FD monitoring occasion.

| SearchSpace field descriptions |
| --- |
| frequencyDomainMonitoringLocations<br>A list of frequency domain offsets to apply to the controlResourceSet.<br>If this field<br>is not provided, zero offset is used. |

In Embodiment #4, the search space configuration can be modified such the number of PDCCH candidates per aggregation level (nrofCandidates parameter) is configured to be potentially different for each frequency offset. A nonlimiting configuration method is illustrated in FIG. 20B.

| SearchSpace field descriptions |
| --- |
| frequencyDomainMonitoringLocationsAndNrofCandidates<br>A list of frequency domain offsets to apply to the<br>controlResourceSet and<br>the corresponding set of candidate numbers using the shifted CORESET.<br>If the frequency domain offset field is not provided, zero offset is used.<br>If nrofCandidatesWithOffset is not provided, the numbers of candidates according to nrofCandidates apply. |

In an aspect of embodiments which include the frequency offsets in the searchSpace information element as shown above, multiple search spaces that are mapped to the same CORESET may optionally be restricted to be configured with frequency offsets that are a subset of a single set of frequency offsets.

Embodiment #4a (Frequency Domain Offset Derived from Separate RRC Parameter

In a variation of Embodiment #4, the frequency offset is derived base on a frequency offset parameter configured within the search space and a separate RRC parameter configured outside the search space.

In one non-limiting example, a list of RB ranges (e.g., one per LBT sub-band) is configured in a separate parameter outside the search space. An RB range indicates the usable PRBs within each LBT sub-band, e.g., excluding the guards. The frequency offset parameter configured inside the search space indicates one of the elements of the list. The UE derives the frequency offset from the indicated RB range from the list. Non-limiting examples of an RB range configuration are:
  Start and end PRB/CRB indices
  Start PRB/CRB index and a length (# of RBs)
  A joint encoding (e.g., RIV) of the Start PRB/CRB index and length In one non-limiting example, the frequency offset derivation is based on the start PRB/CRB index of the RB range. The frequency offset is either the start PRB/CRB index exactly, or the start PRB/CRB index plus an offset.

Embodiment #5 (PDCCH Candidate Puncturing

In a PDCCH search space configured with multiple frequency domain monitoring locations where each monitoring location is configured by a frequency translation of the CCEs defined in the associated CORESET through a frequency offset that is an integer multiple of CCEs:
- If the frequency domain monitoring occasion overlaps with a set of configured guard PRBs or extends outside the configured BWP, and
- If a PDCCH candidate makes use of CCEs that partially/fully overlap the guard PRBs or partially/fully extend outside the BWP, the UE is receives the PDCCH in resources corresponding to that PDCCH candidate with the expectation that there is no transmission in the parts of CCEs that overlap with the guard PRBs or that extend outside the BWP.

Different than embodiment 1 or 2, the CORESET dimension after frequency offset is not modified. PDCCH candidate positions are still calculated based on the original CORESET sizes. However, the PRBs that need unavailable resources (either the guard PRBs or outside of the carrier bandwidth) are not used (effectively punctured).

In a variation of this embodiment, puncturing of PRBs that are unavailable is only used for higher aggregation levels, e.g., aggregation level 8 whereas lower aggregation levels may exclude such PDCCH candidates as in embodiment 2.

Embodiment #6

In a PDCCH search space configured with multiple frequency domain monitoring locations where each monitoring location is configured by a frequency translation of the CCEs defined in the associated CORESET through a frequency offset
Wherein the CORESET configuration contains multiple frequency offsets defined as part of the configuration
Wherein the search space is configured with a set of indices that indicate which of the offsets defined in the CORESET configuration are used for the search space.

Nonlimiting examples of the associated configurations for CORESETs and SearchSpaces are shown in FIG. 20C, ControlResourceSet information element.

| ControlResourceSet field descriptions |
| --- |
| frequencyDomainOffsets<br>A list of frequency domain offsets to apply to the<br>ControlResourceSet. If<br>this field is not provided, zero offset is used. Each offset defines<br>a location of a<br>CORESET in frequency to which a monitoring frequency offset index<br>defined in<br>a search space may be mapped. |

Another nonlimiting example is provided in FIG. 20D.

| SearchSpace field descriptions |
| --- |
| monitoringFrequencyDomainMonitoringOffsets<br>Each bit indicates whether the corresponding frequency offset<br>defined in<br>the controlResourceSet is monitored or not. If this field is not provided, no<br>frequency offset of the CORESET is assumed. |

The flexibility in configuring different numbers of candidates for each frequency monitoring location, as described in embodiment 4, can also be adopted as part of this embodiment by including the same fields in the searchSpace configuration.

Embodiment #6a

In a variation of Embodiment #6, rather than configuring a list of frequency domain offsets (frequencyDomainOffsets parameter) within the CORESET, a list of one or more bitmaps is configured instead, where each bitmap indicates the frequency domain resources for each LBT sub-band:
frequencyDomainResources SEQUENCE {1 . . . maxNrofOffsets} OF BIT STRING (SIZE (45)), This embodiment enables the CORESET configuration to directly specify a smaller frequency domain dimension for an LBT subband to avoid overlapping with guard PRB or extruding beyond the carrier bandwidth.

Figure 7:
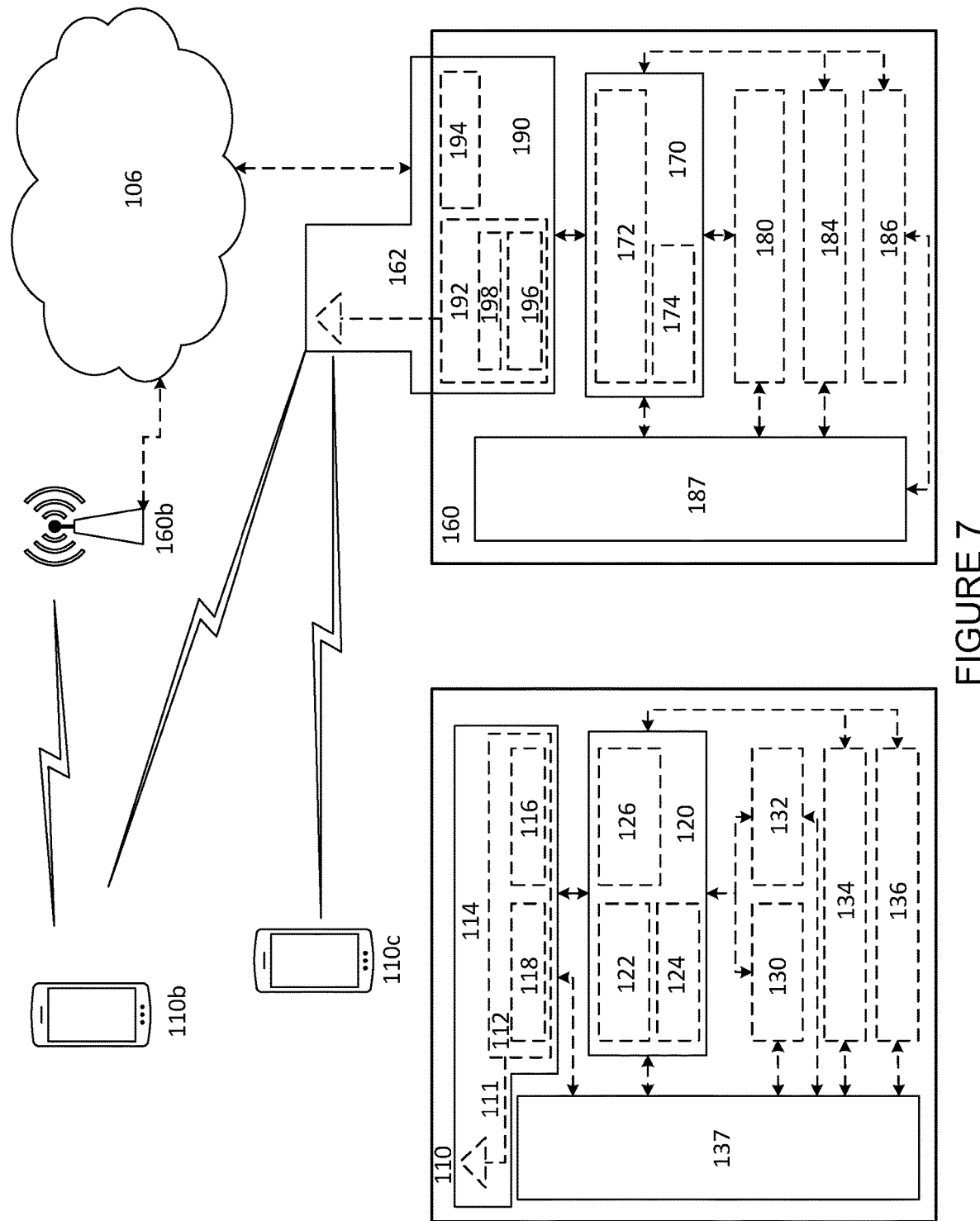
FIG. 7 illustrates a wireless network in accordance with some embodiments.

Then, in the search space configuration, a separate bitmap selects one or more of the elements (bitmaps) from the list of frequency domain resources configured in the CORSET:
monitoringFrequencyDomainLocations BIT STRING (SIZE (maxNrofOffsets)), OPTIONAL, Example Network Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), operation and maintenance (O&M) nodes, operations support system (OSS) nodes, self-optimized network (SON) nodes, positioning nodes (e.g., evolved Serving Mobile Location Centers, E-SMLCs), and/or minimization of drive tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 160 includes processing circuitry 170, device readable medium 180, interface 190, auxiliary equipment 184, power source 186, power circuitry 187, and antenna 162. Although network node 160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 8:
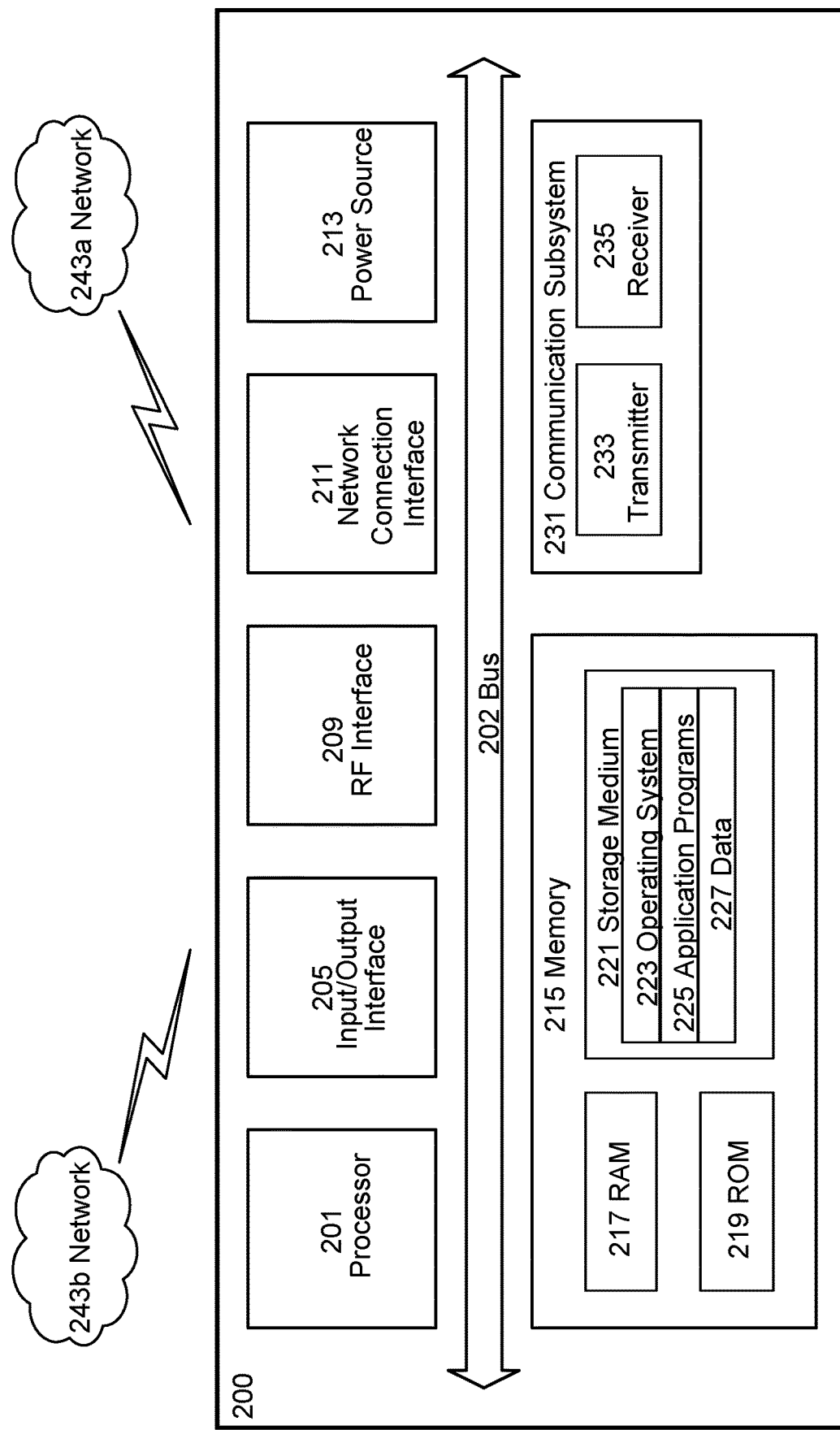
FIG. 8 illustrates User Equipment in accordance with some embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 8, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 8, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 9:
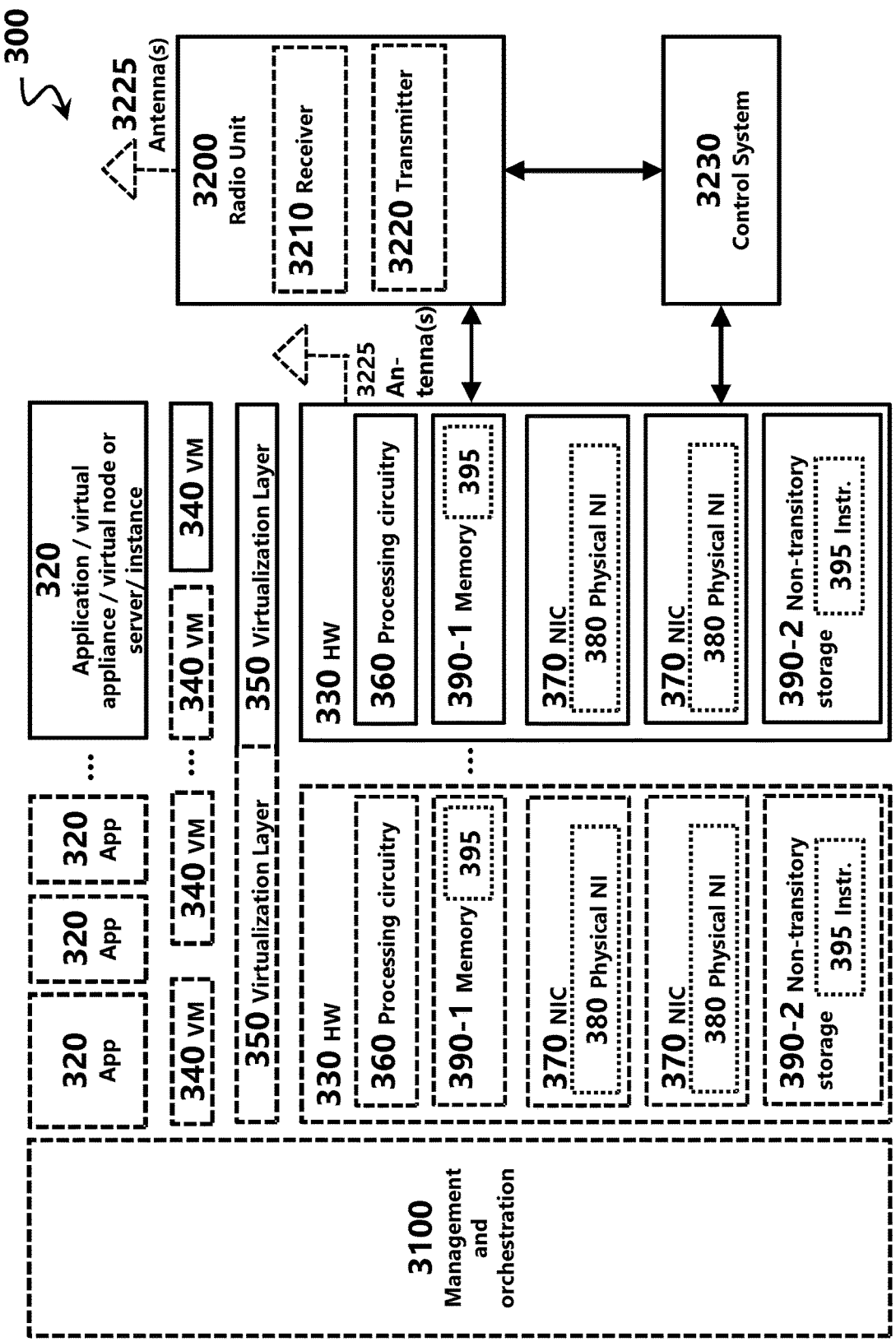
FIG. 9 illustrates a virtualization environment in accordance with some embodiments.

FIG. 9 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 10:
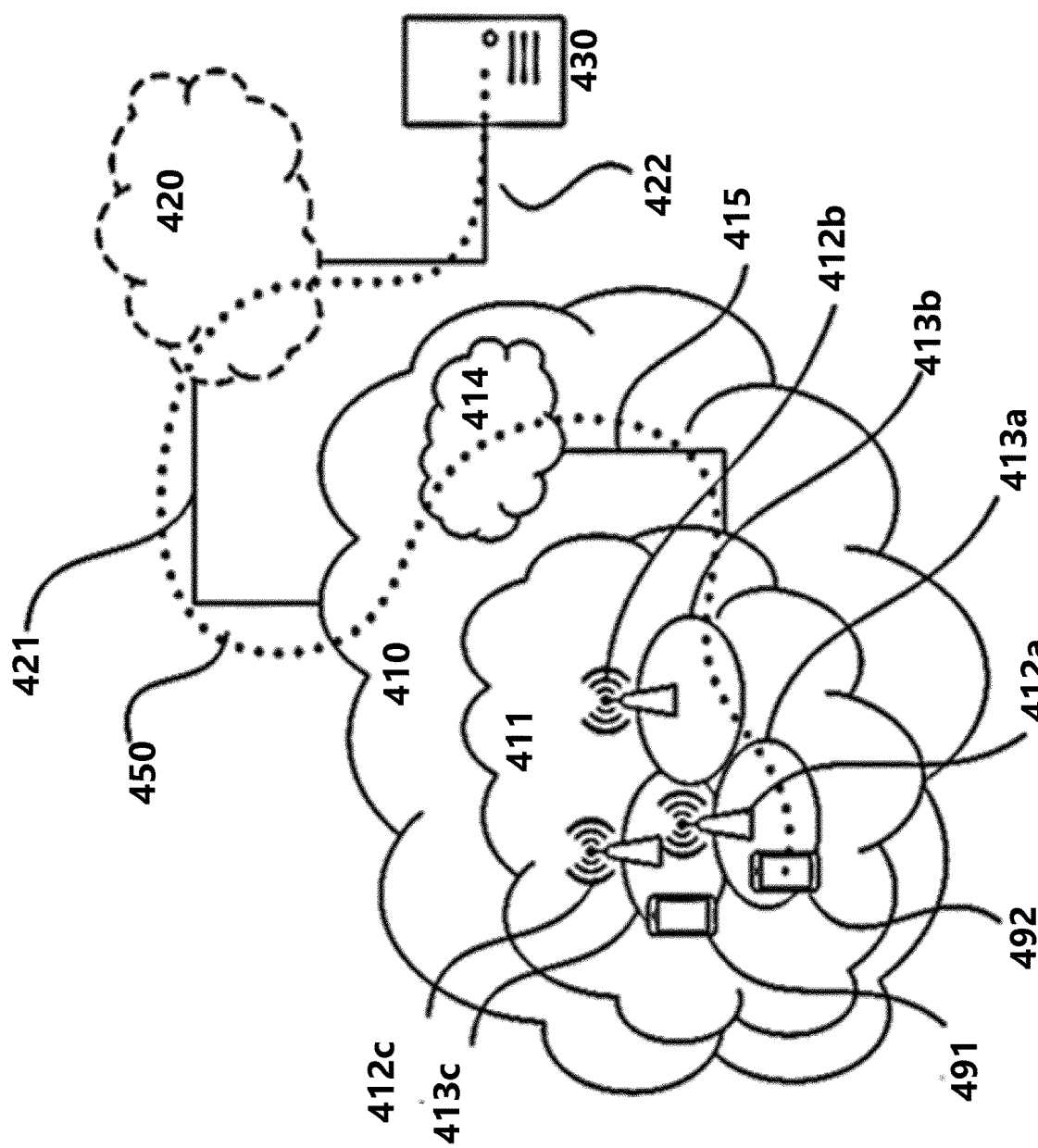
FIG. 10 illustrates a telecommunication network connected via an intermediate network to a host computer in accordance with some embodiments.

With reference to FIG. 10, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 11:
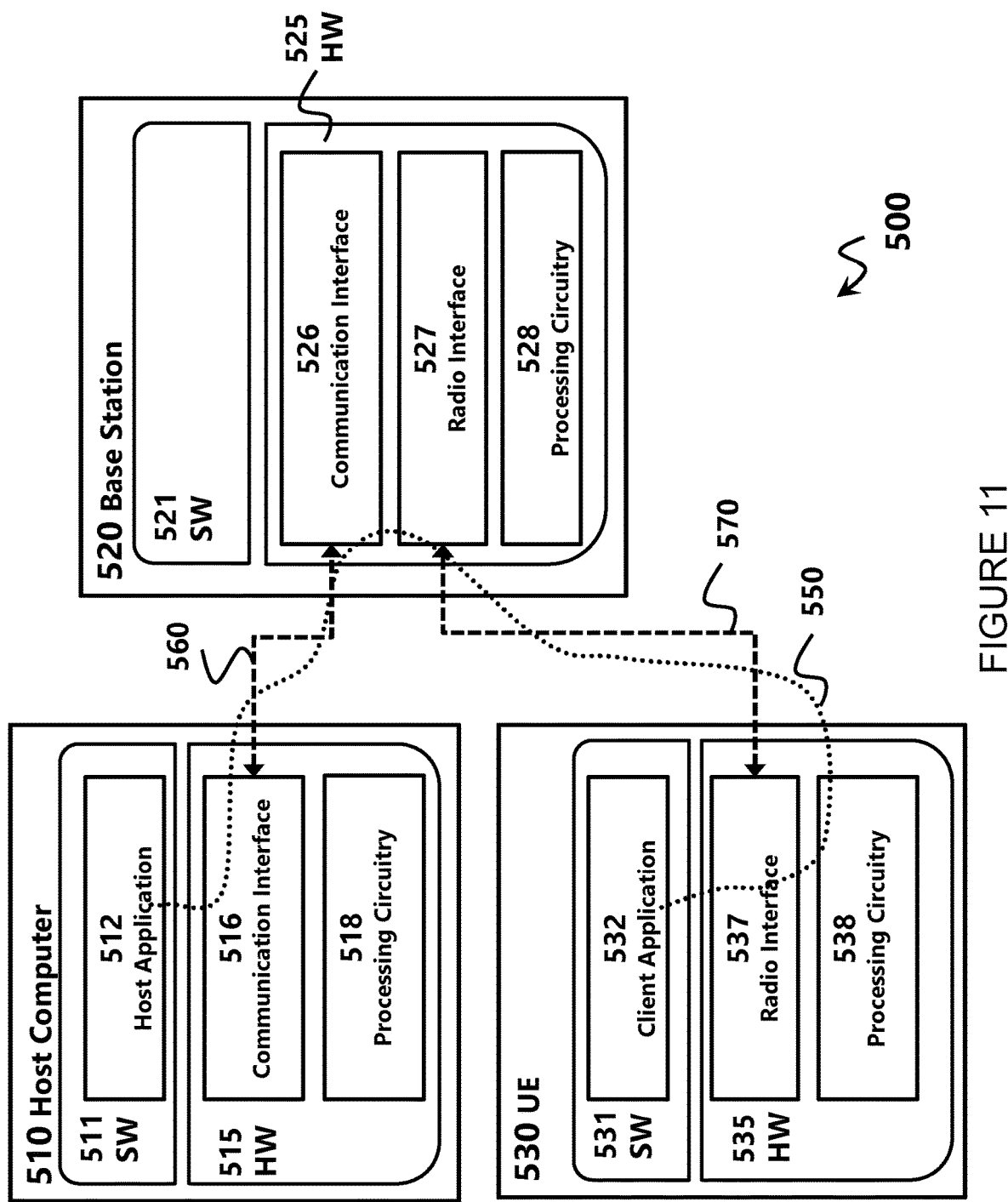
FIG. 11 illustrates a host computer communicating via a base station with a user equipment over a partially wireless connection in accordance with some embodiments.

It is noted that host computer 510, base station 520 and UE 530 illustrated in FIG. 11 may be similar or identical to host computer 430, one of base stations 412*a*, 412*b*, 412*c* and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate or power consumption thereby provide benefits such as reduced user waiting time or extended battery life.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 12:
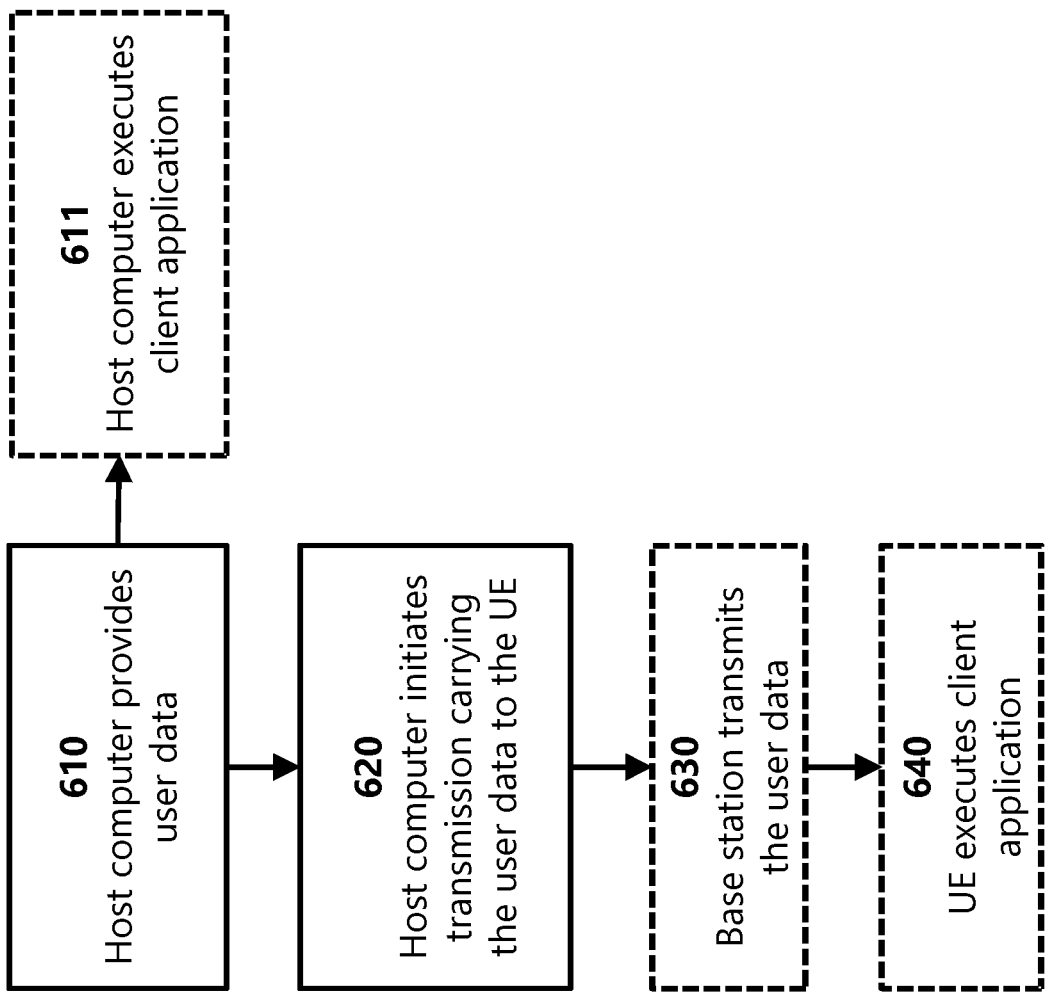
FIG. 12 illustrates methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 13:
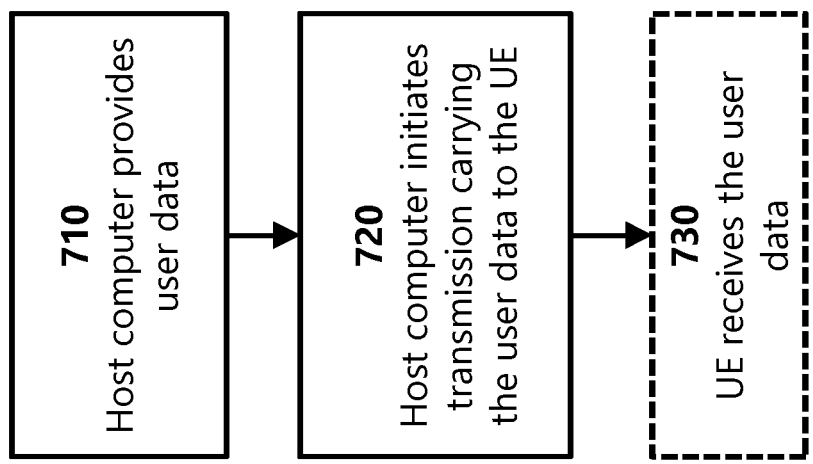
FIG. 13 illustrates methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 14:
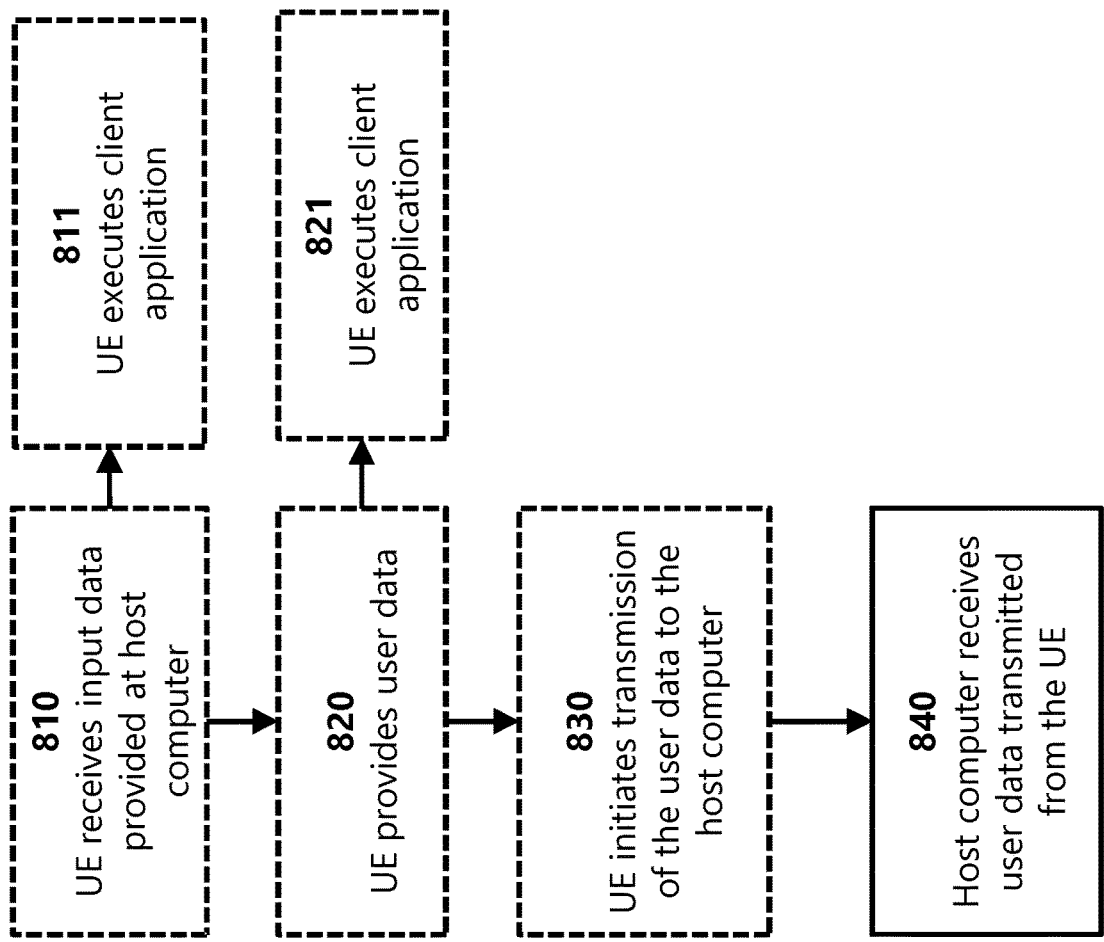
FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 15:
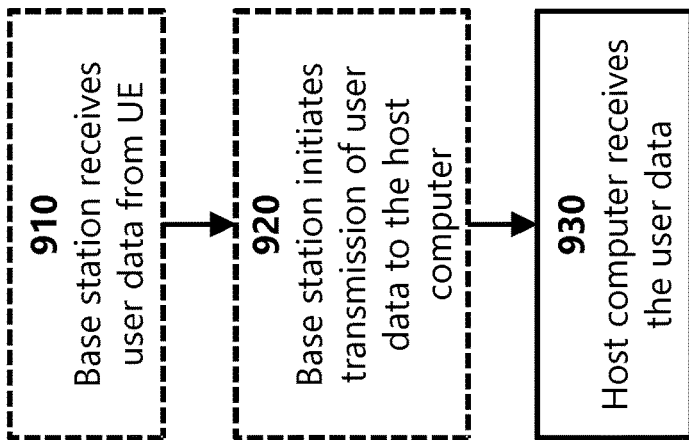
FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 16:
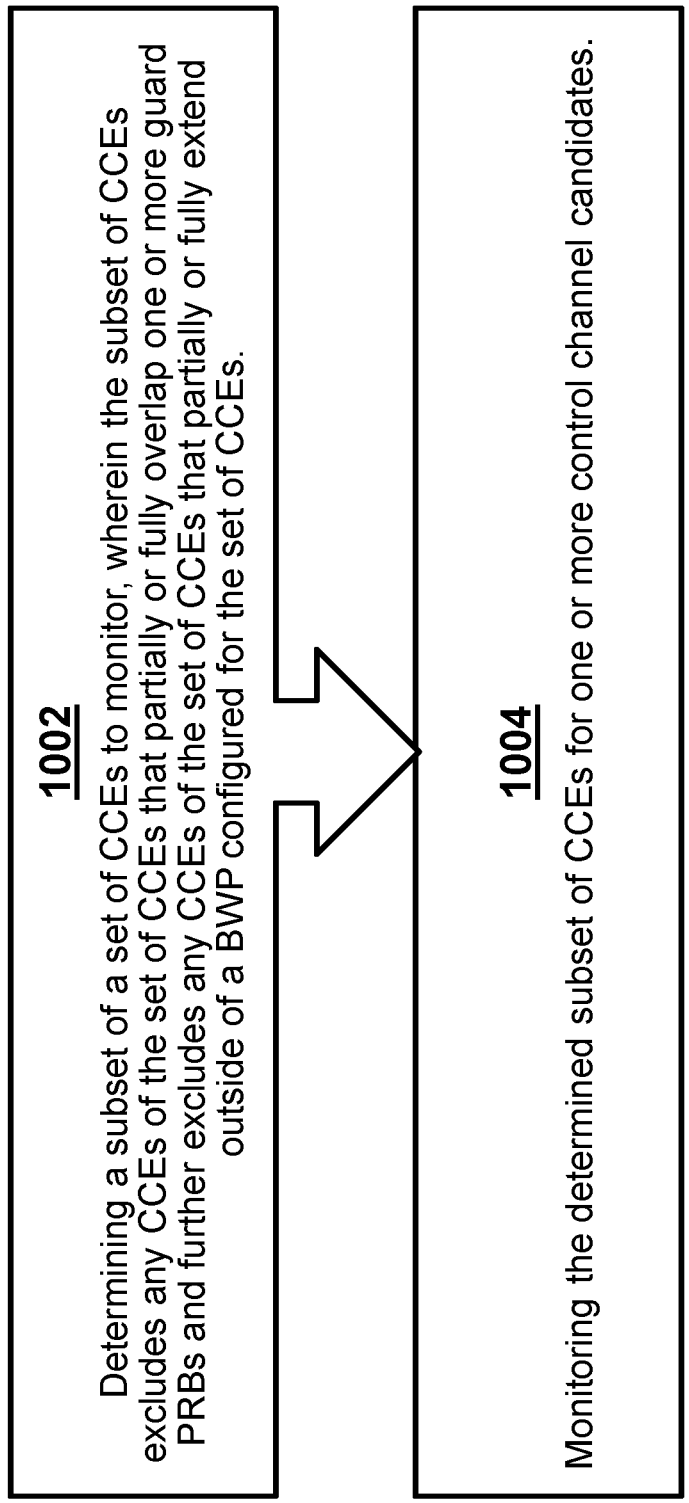
FIG. 16 illustrates a method in accordance with some embodiments.

FIG. 16 depicts a method in accordance with particular embodiments. In certain embodiments, the method may be performed by a wireless device or UE, such as wireless device 110 or UE 200 described above. The method begins at step 1002 with determining a subset of a set of CCEs to monitor. The subset of CCEs excludes any CCEs of the set of CCEs that partially or fully overlap one or more guard PRBs and further excludes any CCEs of the set of CCEs that partially or fully extend outside of a BWP configured for the set of CCEs. At step 1004, the method proceeds with monitoring the subset of CCEs for one or more control channel candidates.

In certain embodiments, a network node (such as network node 160) may perform methods analogous to those described herein as being performed by a wireless device. For example, in general, a network node may determine a subset of resources (e.g., CCEs) using techniques analogous to those described herein as being performed by a wireless device (e.g., UE). The network node may use the subset of resources for performing any suitable operation of the network node, such as transmitting a control channel (e.g., PDCCH). In an embodiment, a network node performs a method comprising determining a subset of a set of CCEs to transmit a control channel. The subset of CCEs excludes any CCEs of the set of CCEs that partially or fully overlap one or more guard PRBs and further excludes any CCEs of the set of CCEs that partially or fully extend outside of a BWP configured for the set of CCEs. The method proceeds with transmitting the control channel via the subset of CCEs.

Figure 17:
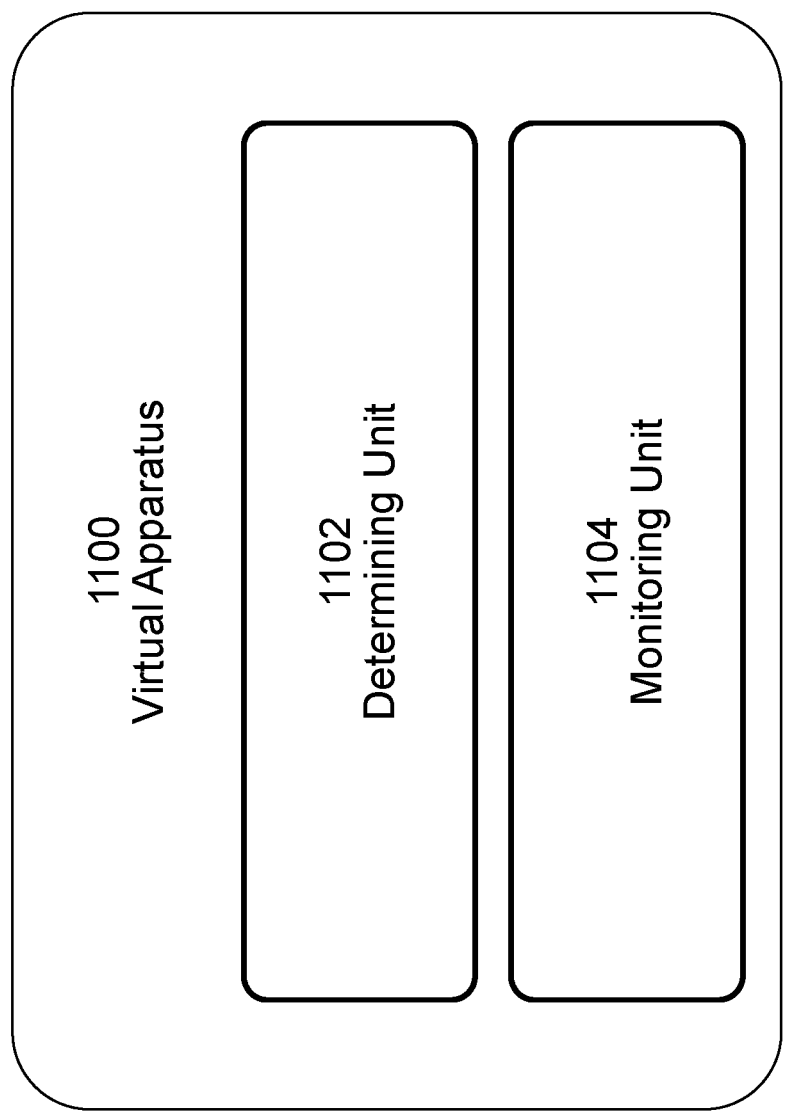
FIG. 17 illustrates a virtualization apparatus in accordance with some embodiments

FIG. 17 illustrates a schematic block diagram of an apparatus 1100 in a wireless network (for example, the wireless network shown in FIG. 7). The apparatus may be implemented in a wireless device or network node (e.g., wireless device 110 or network node 160 shown in FIG. 7). Apparatus 1100 is operable to carry out the example method described with reference to Figure VV and possibly any other processes or methods disclosed herein. It is also to be understood that the method of Figure VV is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining unit WW02, monitoring unit WW04, and any other suitable units of apparatus 1100 to perform corresponding functions according one or more embodiments of the present disclosure.

As illustrated in FIG. 17, apparatus 1100 includes determining unit 1102 and monitoring unit 1104. Determining unit 1102 is configured to determine a subset of a set of CCEs to monitor. The subset of CCEs excludes any CCEs of the set of CCEs that partially or fully overlap one or more guard PRBs and further excludes any CCEs of the set of CCEs that partially or fully extend outside of a BWP configured for the set of CCEs. Monitoring unit 1104 is configured to monitor the subset of CCEs (e.g., to search for control channel candidates).

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 18:
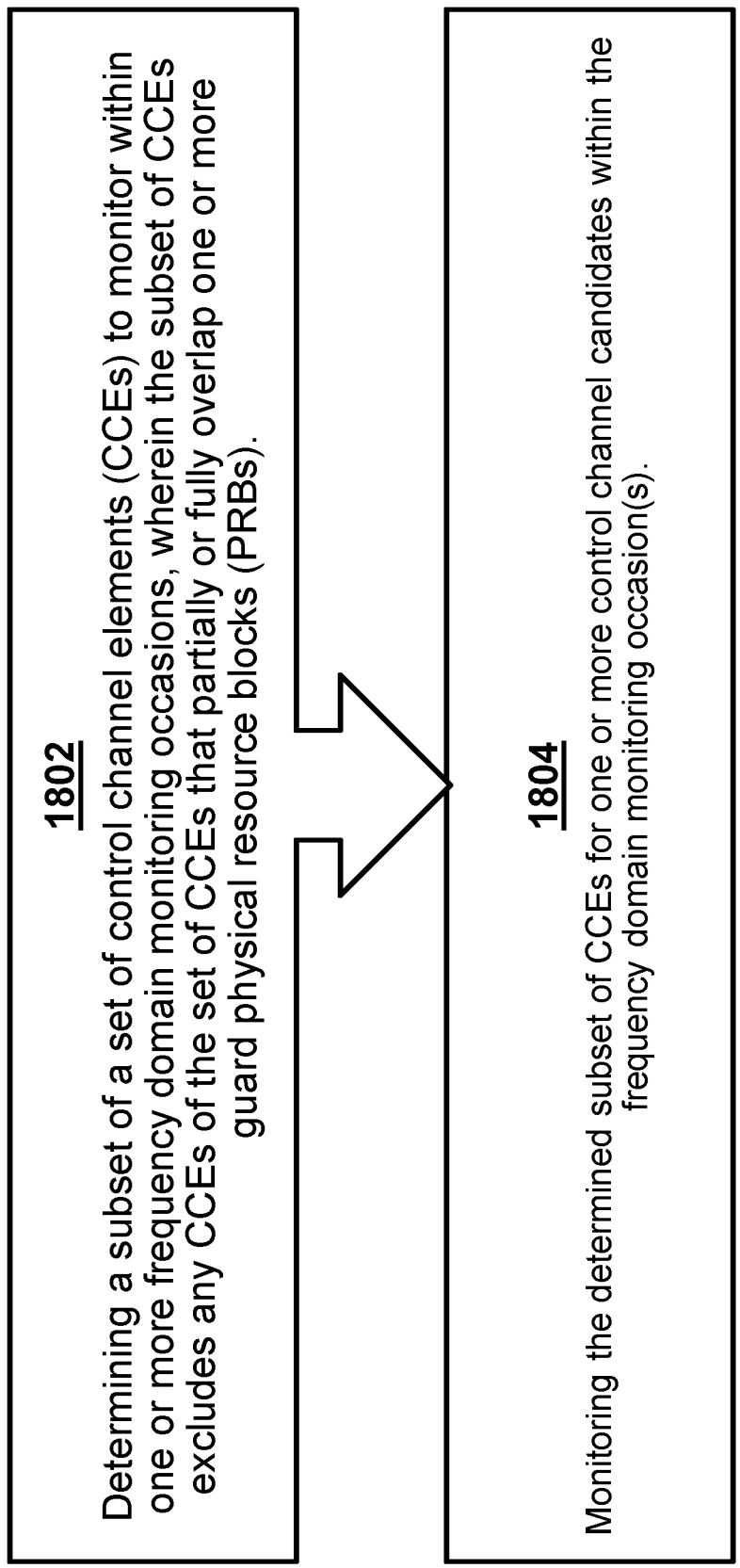
FIG. 18 illustrates a method performed by a wireless device in accordance with some embodiments.

FIG. 18 illustrates an example of a method performed by a wireless device. In certain embodiments, the method may be performed by wireless device 110 comprising memory 130 operable to store instructions and processing circuitry 120 operable to execute the instructions to cause wireless device 110 to perform the method. As an example, in certain embodiments, the method may be performed by UE 200 comprising memory 215 operable to store instructions and processing circuitry (e.g., processor 201) operable to execute the instructions to cause UE 200 to perform the method.

At step 1802, the wireless device determines a subset of a set of CCEs to monitor within a frequency domain monitoring occasion. The subset of CCEs excludes any CCEs of the set of CCEs that partially or fully overlap one or more guard PRBs. Examples of methods for determining the CCEs to monitor include those described above with respect to the headings Embodiment #1 (CORESET shrinkage), Embodiment #1a (CORESET shrinkage by fraction of a CCE), Embodiment #2 (PDCCH candidate exclusion), Embodiment #2a (PDCCH skipping), Embodiment #3, Embodiment #4, Embodiment #4a (Frequency Domain Offset Derived from Separate RRC Parameter), Embodiment #5 (PDCCH candidate puncturing), Embodiment #6, and Embodiment #6a.

In certain embodiments, the set of CCEs correspond to a search space. The search space comprises frequency domain monitoring locations that the wireless device monitors for a control channel. As an example, the search space may be determined based on a frequency translation of CCEs defined in an associated CORESET, wherein the frequency translation is based on a frequency offset that is an integer multiple of CCEs.

In certain embodiments, determining the subset of CCEs to monitor within the frequency domain monitoring occasion comprises shrinking an original size of a CORESET to exclude the one or more CCEs or CCE fractions that partially or fully overlap one or more of the guard PRBs. Examples include Embodiment #1 and Embodiment #1a described above. Embodiment #1 describes an example that encompasses the wireless device itself determining the CCEs that partially or fully overlap one or more of the guard PRBs and automatically excluding the CCEs that partially or fully overlap one or more of the guard PRBs from the subset of CCEs to monitor within the frequency domain monitoring occasion. Automatically excluding the CCEs that partially or fully overlap one or more of the guard PRBs may comprise monitoring all of the CCEs associated with a subband for which the PRBs of a CORESET do not overlap with any of the guard PRBs (such as subband #2 in FIG. 6 where the CORESET's frequency domain dimension remains 8 CCEs) and monitoring fewer than all of the CCEs associated with a subband for which the PRBs of a CORESET overlaps with one or more of the guard PRBs (such as subband #3 in FIG. 6 where the CORESET's frequency domain dimension shrinks to 7 CCEs).

Similarly, Embodiment #1a describes an example that encompasses the wireless device itself determining one or more CCE fractions that partially or fully overlap one or more of the guard PRBs and automatically excluding the one or more CCE fractions that partially or fully overlap one or more of the guard PRBs from the subset of CCEs or CCE fractions to monitor within the frequency domain monitoring occasion. Each CCE fraction comprises an integer number of REG bundles (bundles of contiguous REGs) associated with one of the CCEs.

Embodiments where the wireless device determines which CCEs or CCE fractions to automatically exclude may be well-suited to networks that use a legacy (Rel-15) CORESET/Search Space configuration and/or other networks where the network node does not provide the wireless device with a parameter that indicates the frequency translation of the PRBs of a CORESET (e.g., networks where the network node does not provide the wireless device with a freqMonitorLocations-r16 parameter or similar parameter in a future release).

In certain embodiments, determining the subset of CCEs to monitor within the frequency domain monitoring occasion comprises determining the search space based on an original size of the CORESET (e.g., rather than shrinking the size of the CORESET) and excluding a control channel candidate or skipping (not monitoring) a control channel in order to exclude any CCEs that partially or fully overlap one or more of the guard PRBs. Examples include Embodiment #2 (which encompasses the wireless device monitoring a lower aggregation level than an aggregation level that would make use of one or more CCEs that partially or fully overlap one or more of the guard CCEs) and Embodiment #2a (which encompasses the wireless device skipping (not monitoring) a control channel candidate if frequency resources corresponding to that control channel candidate fully or partially overlap one or more of the guard PRBs).

In certain embodiments, such as Embodiment #3 described above, a reference point for common resource block (CRB) index zero (e.g., "Point A") is configured to minimize a number of the CCEs that partially or fully overlap one or more of the guard PRBs for a respective carrier. In certain embodiments, a first CRB index of the carrier is configured based on an RB offset from the reference point. As an example, the RB offset may be configured through a parameter, such as offsetToCarrier.

Embodiments #4, #4a, #6, and #6a describe examples in which the wireless device determines the subset of CCEs based on configuration information received from the network node. As an example, in certain embodiments, the wireless device determines the subset of CCEs to monitor within the frequency domain monitoring occasion based on receiving a frequency domain monitoring locations configuration from the network node. The frequency domain monitoring locations configuration indicates which set(s) of RBs (also referred to as RB range(s) or RB sets) shall be monitored for control channel candidates. Each set of RBs corresponds to PRBs of the frequency domain monitoring occasion(s) and does not overlap any of the guard PRBs. In some embodiments, the frequency domain monitoring locations configuration comprises a bitmap that indicates which set(s) of RBs to monitor. In some embodiments, the frequency domain monitoring locations configuration is received in a search space configuration field. In some embodiments, the configuration of sets of RBs is received in a parameter configured outside of the search space configuration field. In some embodiments, the configuration of a set(s) of RBs comprises an index of the starting RB and a number of RBs for each set of RBs.

As an example, suppose the wireless device receives RB set configuration information from the network node configuring four RB sets: A, B, C, and D. The RB configuration information may provide an index of the starting RB and a number of RBs for each of RB set A, RB set B, RB set C, and RB set D. Wireless device may also receive a frequency domain monitoring locations configuration from the network node. The frequency domain monitoring locations configuration may comprise a four-bit bitmap with the first bit corresponding to RB set A, the second bit corresponding to RB set B, the third bit corresponding to RB set C, and the fourth bit corresponding to RB set D. The network node may assign each bit a first value (e.g., "1") to indicate that the wireless device shall monitor the corresponding RB set or a second value (e.g., "0") to indicate that the wireless device need not monitor the corresponding RB set. Continuing with the example, a bitmap of "1100" would indicate to monitor RB sets A and B, whereas a bitmap of "1010" would indicate to monitor RB sets A and C.

At step 1804, the wireless device monitors the subset of CCEs determined in step 1802 for one or more control channel candidates within the frequency domain monitoring occasion. In certain embodiments, if the wireless device defects a control channel, the wireless device can use information obtained from the control channel when performing an operation of the wireless device. As an example, the control channel may indicate downlink control information that the wireless device may use for receiving data from a network node.

Figure 19:
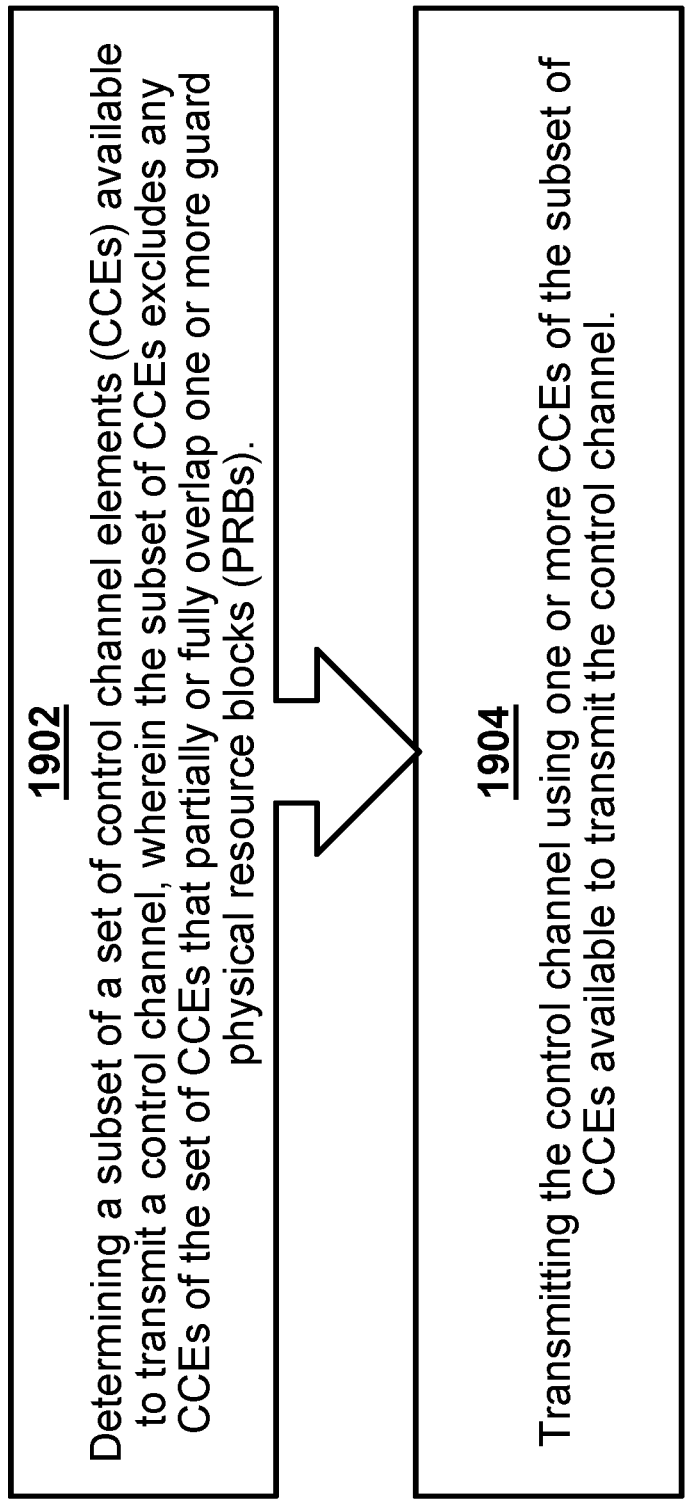
FIG. 19 illustrates a method performed by a network node in accordance with some embodiments.

FIG. 19 illustrates an example of a method performed by a network node. In certain embodiments, the method may be performed by network node 160 comprising memory 180 operable to store instructions and processing circuitry 170 operable to execute the instructions to cause network node 160 to perform the method. In certain embodiments, the functionality performed by the network node in FIG. 19 may be reciprocal to the functionality performed by the wireless device in FIG. 18. For example, information described as being provided by a network node in FIG. 19 may be received by the wireless device in FIG. 18, and vice versa.

At step 1902, the network node determines a subset of a set of CCEs available to transmit a control channel. The subset of CCEs excludes any CCEs of the set of CCEs that partially or fully overlap one or more guard PRBs. In certain embodiments, the set of CCEs correspond to a search space of a wireless device. The search space comprises frequency domain monitoring locations that the wireless device monitors for the control channel. The search space is based on a frequency translation of CCEs defined in an associated CORESET. The frequency translation is based on a frequency offset that is an integer multiple of CCEs. Various examples of methods for determining the subset of CCEs are described below.

In certain embodiments, determining the subset of CCEs comprises determining the CCEs that partially or fully overlap one or more of the guard PRBs and automatically excluding the CCEs that partially or fully overlap one or more of the guard PRBs from the subset of CCEs. As an example, the subset of CCEs may comprise all of the CCEs associated with a subband for which the PRBs of a CORESET do not overlap with any of the guard PRBs, but fewer than all of the CCEs associated with a subband for which the PRBs of a CORESET overlaps with one or more of the guard PRBs.

In certain embodiments, determining the subset of CCEs comprises determining one or more CCE fractions that partially or fully overlap one or more of the guard PRBs and automatically excluding the one or more CCE fractions that partially or fully overlap one or more of the guard PRBs from the subset of CCEs or CCE fractions available to transmit the control channel. Each CCE fraction comprises an integer number of REG bundles (bundles of contiguous REGs) associated with one of the CCEs.

In certain embodiments, determining the subset of CCEs comprises shrinking an original size of a CORESET to exclude the one or more CCEs or CCE fractions that partially or fully overlap one or more of the guard PRBs.

In certain embodiments, the search space is determined based on an original size of the CORESET and excluding any CCEs that partially or fully overlap one or more of the guard PRBs comprises excluding a control channel candidate or skipping a control channel.

In certain embodiments, determining the subset of CCEs comprises skipping (not including) a control channel candidate if frequency resources corresponding to that control channel candidate fully or partially overlap one or more of the guard PRBs.

In certain embodiments, the network node sends a wireless device configuration information that enables the wireless device to determine a subset of a set of CCEs to monitor within a frequency domain monitoring occasion. The subset of CCEs excludes any CCEs of the set of CCEs that partially or fully overlap one or more guard PRBs. As an example, in certain embodiments, the network node sends a frequency domain monitoring locations configuration to the wireless device. The frequency domain monitoring locations configuration indicates which set(s) of RBs shall be monitored for control channel candidates. Each set of RBs corresponds to PRBs of one or more frequency domain monitoring occasion(s) and does not overlap any of the guard PRBs. In some embodiments, the frequency domain monitoring locations configuration comprises a bitmap that indicates which set(s) of RBs to monitor. In some embodiments, the frequency domain monitoring locations configuration is sent in a search space configuration field. In some embodiments, the configuration of sets of RBs is sent from the network node to the wireless device in a parameter configured outside of the search space configuration field. In some embodiments, the configuration of a set(s) of RBs comprises an index of the starting RB and a number of RBs for each set of RBs. In some embodiments, a reference point for CRB index zero is configured to minimize a number of the CCEs that partially or fully overlap one or more of the guard PRBs for a respective carrier.

At step 1904, the network node transmits the control channel using one or more CCEs of the subset of CCEs available to transmit the control channel (i.e., one or more of CCEs of the subset of CCEs determined in step 1902). In some embodiments, the control channel is transmitted using a lower aggregation level than an aggregation level that would make use of one or more CCEs that partially or fully overlap one or more of the guard CCEs.

EMBODIMENTS

Group A Embodiments
1. A method performed by a wireless device, the method comprising:
    determining a subset of a set of control channel elements (CCEs) to monitor during a frequency domain monitoring occasion, wherein the subset of CCEs excludes any CCEs of the set of CCEs that partially or fully overlap one or more guard physical resource blocks (PRBs); and
    monitoring the determined subset of CCEs for one or more control channel candidates during the frequency domain monitoring occasion.
2. A method performed by a wireless device, the method comprising:
    determining a subset of a set of control channel elements (CCEs) to monitor during a frequency domain monitoring occasion, wherein the subset of CCEs excludes any CCEs of the set of CCEs that partially or fully extend outside of a bandwidth part configured for the set of CCEs; and
    monitoring the determined subset of CCEs for one or more control channel candidates during the frequency domain monitoring occasion.
3. The method of any of the previous embodiments, further comprising:
    providing user data; and
    forwarding the user data to a host computer via the transmission to the base station.

Group B Embodiments
4. A method performed by a base station, the method comprising:
    determining a subset of a set of control channel elements (CCEs) to transmit a control channel, wherein the subset of CCEs excludes any CCEs of the set of CCEs that partially or fully overlap one or more guard physical resource blocks (PRBs); and
    transmitting the control channel using the subset of CCEs.
5. A method performed by a base station, the method comprising:
    determining a subset of a set of control channel elements (CCEs) to transmit a control channel, wherein the subset of CCEs excludes any CCEs of the set of CCEs that partially or fully extend outside of a bandwidth part configured for the set of CCEs; and
    transmitting the control channel using the subset of CCEs.
6. The method of any of the previous embodiments, further comprising:

obtaining user data; and forwarding the user data to a host computer or a wireless device.

Group C Embodiments

7. A wireless device, the wireless device comprising:
processing circuitry configured to perform any of the steps of any of the Group A embodiments; and
power supply circuitry configured to supply power to the wireless device.

8. A base station, the base station comprising:
processing circuitry configured to perform any of the steps of any of the Group B embodiments;
power supply circuitry configured to supply power to the base station.

9. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

10. A computer program, the computer program comprising instructions which when executed on a computer perform any of the steps of any of the Group A embodiments.

11. A computer program product comprising a computer program, the computer program comprising instructions which when executed on a computer perform any of the steps of any of the Group A embodiments.

12. A non-transitory computer-readable storage medium or carrier comprising a computer program, the computer program comprising instructions which when executed on a computer perform any of the steps of any of the Group A embodiments.

13. A computer program, the computer program comprising instructions which when executed on a computer perform any of the steps of any of the Group B embodiments.

14. A computer program product comprising a computer program, the computer program comprising instructions which when executed on a computer perform any of the steps of any of the Group B embodiments.

15. A non-transitory computer-readable storage medium or carrier comprising a computer program, the computer program comprising instructions which when executed on a computer perform any of the steps of any of the Group B embodiments.

16. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

17. The communication system of the pervious embodiment further including the base station.

18. The communication system of the previous 2 embodiments, further including the UE, wherein the UE is configured to communicate with the base station.

19. The communication system of the previous 3 embodiments, wherein:
the processing circuitry of the host computer is configured to execute a host application, thereby providing the user data; and
the UE comprises processing circuitry configured to execute a client application associated with the host application.

20. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

21. The method of the previous embodiment, further comprising, at the base station, transmitting the user data.

22. The method of the previous 2 embodiments, wherein the user data is provided at the host computer by executing a host application, the method further comprising, at the UE, executing a client application associated with the host application.

23. A user equipment (UE) configured to communicate with a base station, the UE comprising a radio interface and processing circuitry configured to performs the of the previous 3 embodiments.

24. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

25. The communication system of the previous embodiment, wherein the cellular network further includes a base station configured to communicate with the UE.

26. The communication system of the previous 2 embodiments, wherein:
the processing circuitry of the host computer is configured to execute a host application, thereby providing the user data; and
the UE's processing circuitry is configured to execute a client application associated with the host application.

27. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.
28. The method of the previous embodiment, further comprising at the UE, receiving the user data from the base station.
29. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.
30. The communication system of the previous embodiment, further including the UE.
31. The communication system of the previous 2 embodiments, further including the base station, wherein the base station comprises a radio interface configured to communicate with the UE and a communication interface configured to forward to the host computer the user data carried by a transmission from the UE to the base station.
32. The communication system of the previous 3 embodiments, wherein:
   the processing circuitry of the host computer is configured to execute a host application; and
   the UE's processing circuitry is configured to execute a client application associated with the host application, thereby providing the user data.
33. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.
34. A method implemented in a communication system including a host computer, a base station and a user equipment (UE), the method comprising:
   at the host computer, receiving user data transmitted to the base station from the UE, wherein the UE performs any of the steps of any of the Group A embodiments.
35. The method of the previous embodiment, further comprising, at the UE, providing the user data to the base station.
36. The method of the previous 2 embodiments, further comprising:
   at the UE, executing a client application, thereby providing the user data to be transmitted; and
   at the host computer, executing a host application associated with the client application.
37. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.
38. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
39. The communication system of the previous embodiment further including the base station.
40. The communication system of the previous 2 embodiments, further including the UE, wherein the UE is configured to communicate with the base station.
41. The communication system of the previous 3 embodiments, wherein:
   the processing circuitry of the host computer is configured to execute a host application;
   the UE is configured to execute a client application associated with the host application, thereby providing the user data to be received by the host computer.
42. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.
43. The method of the previous embodiment, further comprising at the base station, receiving the user data from the UE.
44. The method of the previous 2 embodiments, further comprising at the base station, initiating a transmission of the received user data to the host computer.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
CA Carrier Aggregation
CDMA Code Division Multiplexing Access
CP Cyclic Prefix
DL Downlink
eNB evolved NodeB
ePDCCH enhanced Physical Downlink Control Channel
FFS For Further Study
gNB Base station in NR
GSM Global System for Mobile communication
LTE Long-Term Evolution
MAC Medium Access Control
MME Mobility Management Entity
MSC Mobile Switching Center
NPDCCH Narrowband Physical Downlink Control Channel
NR New Radio
OFDM Orthogonal Frequency Division Multiplexing
PDCCH Physical Downlink Control Channel
PDSCH Physical Downlink Shared Channel
PUSCH Physical Uplink Shared Channel
RAN Radio Access Network
RNC Radio Network Controller
RRC Radio Resource Control
UE User Equipment
UL Uplink
UMTS Universal Mobile Telecommunication System
UTRAN Universal Terrestrial Radio Access Network
WCDMA Wide CDMA
WLAN Wide Local Area Network

The invention claimed is:

1. A method performed by a wireless device, the method comprising:
receiving a frequency domain monitoring locations configuration from a network node, the frequency domain monitoring locations configuration indicating which set(s) of resource blocks (RBs), out of multiple RBs, shall be monitored for control channel candidates, wherein each indicated set of RBs corresponds to physical resource blocks (PRBs) of a respective frequency domain monitoring occasion that does not overlap any guard PRBs, wherein each frequency domain monitoring occasion is determined by a frequency translation of control channel elements (CCEs) defined in an associated control resource set (CORESET) through a frequency offset; and
monitoring for one or more control channel candidates within the frequency domain monitoring occasion(s) based on the received frequency domain monitoring locations configuration.

2. The method of claim 1, wherein the frequency domain monitoring locations configuration comprises a bitmap that indicates which set(s) of RBs to monitor.

3. The method of claim 1, wherein the frequency domain monitoring locations configuration is received in a search space configuration field.

4. The method of any claim 1, wherein the configuration of sets of RBs is received in a parameter configured outside of the search space configuration field.

5. The method of claim 4, wherein the configuration of a set(s) of RBs comprises an index of the starting RB and a number of RBs for each set of RBs.

6. A wireless device comprising:
memory operable to store instructions; and
processing circuitry operable to execute the instructions to cause the wireless device to:
receive a frequency domain monitoring locations configuration from a network node, the frequency domain monitoring locations configuration indicating which set(s) of resource blocks (RBs), out of multiple RBs, shall be monitored for control channel candidates, wherein each indicated set of RBs corresponds to physical resource blocks (PRBs) of a respective frequency domain monitoring occasion that does not overlap any guard PRBs, wherein each frequency domain monitoring occasion is determined by a frequency translation of control channel elements (CCEs) defined in an associated control resource set (CORESET) through a frequency offset; and
monitor for one or more control channel candidates within the frequency domain monitoring occasion(s) based on the received frequency domain monitoring locations configuration.

7. The wireless device of claim 6, wherein the frequency domain monitoring locations configuration comprises a bitmap that indicates which set(s) of RBs to monitor.

8. The wireless device of claim 6, wherein the frequency domain monitoring locations configuration is received in a search space configuration field.

9. The wireless device of claim 6, wherein the configuration of sets of RBs is received in a parameter configured outside of the search space configuration field.

10. The wireless device of claim 6, wherein the configuration of a set(s) of RBs comprises an index of the starting RB and a number of RBs for each set of RBs.

11. A method performed by a network node, the method comprising:
sending a frequency domain monitoring locations configuration to a wireless device, the frequency domain monitoring locations configuration indicating which set(s) of resource blocks (RBs), out of multiple RBs, shall be monitored for control channel candidates, wherein each indicated set of RBs corresponds to physical resource blocks (PRBs) of a respective frequency domain monitoring occasion that does not overlap any guard PRBs, wherein each frequency domain monitoring occasion is determined by a frequency translation of control channel elements (CCEs) defined in an associated control resource set (CORESET) through a frequency offset; and
transmitting a control channel within the frequency domain monitoring occasion(s) based on the frequency domain monitoring locations configuration.

12. The method of claim 11, wherein the frequency domain monitoring locations configuration comprises a bitmap that indicates which set(s) of RBs to monitor.

13. The method of claim 11, wherein the frequency domain monitoring locations configuration is sent in a search space configuration field.

14. The method of claim 11, wherein the configuration of sets of RBs is sent from the network node to the wireless device in a parameter configured outside of the search space configuration field.

15. The method of claim 14, wherein the configuration of a set(s) of RBs comprises an index of the starting RB and a number of RBs for each set of RBs.

16. A network node comprising:
memory operable to store instructions; and
processing circuitry operable to execute the instructions to cause the network node to:
send a frequency domain monitoring locations configuration to a wireless device, the frequency domain monitoring locations configuration indicating which set(s) of resource blocks (RBs), out of multiple RBs, shall be monitored for control channel candidates, wherein each indicated set of RBs corresponds to physical resource blocks (PRBs) of a respective frequency domain monitoring occasion that does not overlap any guard PRBs, wherein each frequency domain monitoring occasion is determined by a frequency translation of control channel elements (CCEs) defined in an associated control resource set (CORESET) through a frequency offset; and transmit a control channel within the frequency domain monitoring occasion(s) based on the frequency domain monitoring locations configuration.

17. The network node of claim 16, wherein the frequency domain monitoring locations configuration comprises a bitmap that indicates which set(s) of RBs to monitor.

18. The network node of claim 16, wherein the frequency domain monitoring locations configuration is sent in a search space configuration field.

19. The network node of claim 16, wherein the configuration of sets of RBs is sent from the network node to the wireless device in a parameter configured outside of the search space configuration field.

20. The network node of claim 19, wherein the configuration of a set(s) of RBs comprises an index of the starting RB and a number of RBs for each set of RBs.

* * * * *